US012720468B2

(12) United States Patent
Wang et al.

(10) Patent No.: US 12,720,468 B2
(45) Date of Patent: Aug. 25, 2026

(54) METHOD AND APPARATUS FOR SIDELINK POSITIONING

(71) Applicant: HUAWEI TECHNOLOGIES CO., LTD., Shenzhen (CN)

(72) Inventors: Qi Wang, Munich (DE); Xitao Gong, Munich (DE); Richard Stirling-Gallacher, Munich (DE)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 405 days.

(21) Appl. No.: 18/351,927

(22) Filed: Jul. 13, 2023

(65) Prior Publication Data

US 2023/0362874 A1 Nov. 9, 2023

Related U.S. Application Data

(63) Continuation of application No. PCT/EP2021/050772, filed on Jan. 15, 2021.

(51) Int. Cl.
*H04W 64/00* (2009.01)
*H04L 5/00* (2006.01)

(52) U.S. Cl.
CPC ........... *H04W 64/00* (2013.01); *H04L 5/0051* (2013.01)

(58) Field of Classification Search
CPC ..... H04W 64/00; H04W 76/14; H04W 24/10; H04W 92/18; H04W 16/28; H04W 72/02; H04W 72/046; H04W 76/28; H04W 8/24; H04W 24/08; H04W 28/0268; H04W 8/22; H04W 88/02
USPC ........ 455/456.1, 461, 67.11, 452.1, 427, 522
See application file for complete search history.

(56) References Cited

U.S. PATENT DOCUMENTS

| | | | | |
|---|---|---|---|---|
| 11,245,504 | B2 * | 2/2022 | Hessler | H04L 5/0051 |
| 12,167,254 | B2 * | 12/2024 | Karjalainen | H04W 24/10 |
| 2016/0095080 | A1 | 3/2016 | Khoryaev et al. | |
| 2016/0227373 | A1 * | 8/2016 | Tsai | G01S 5/0072 |
| 2016/0337805 | A1 | 11/2016 | Liao et al. | |
| 2019/0230618 | A1 | 7/2019 | Saur et al. | |
| 2021/0243554 | A1 * | 8/2021 | Wu | H04W 72/51 |
| 2022/0007327 | A1 * | 1/2022 | Choi | H04W 64/006 |

(Continued)

FOREIGN PATENT DOCUMENTS

| | | | |
|---|---|---|---|
| WO | 2018068817 | A1 | 4/2018 |
| WO | 2019197036 | A1 | 10/2019 |

OTHER PUBLICATIONS

3rd Generation Partnership Project; Technical Specification Group Radio Access Network; Study on NR positioning support (Release 16), 3GPP TR 38.855 V16.0.0 (Mar. 2019), Technical Report, total 197 pages.

(Continued)

*Primary Examiner* — Joseph Arevalo
(74) *Attorney, Agent, or Firm* — WOMBLE BOND DICKINSON (US) LLP

(57) ABSTRACT

The present disclosure relates to techniques for UE-based location reference service. In particular the disclosure relates to first user device, comprising: a transceiver, configured to receive a location reference indication configuration to configure the first user device to transmit or receive an indication message; and transmit or receive an indication message over a sidelink, wherein the indication message is indicative of a location reference is available on the sidelink for positioning assistance.

20 Claims, 17 Drawing Sheets

(56) References Cited

U.S. PATENT DOCUMENTS

| | | | | |
|---|---|---|---|---|
| 2022/0167303 A1* | 5/2022 | Lee | H04W 64/006 | |
| 2022/0209927 A1* | 6/2022 | Shreevastav | H04L 5/0069 | |
| 2023/0262658 A1* | 8/2023 | Bai | H04L 5/0051 | 370/329 |
| 2023/0354246 A1* | 11/2023 | Cao | H04L 5/0051 | |

OTHER PUBLICATIONS

LG Electronics, FirstNet et al: "New SID: Study on scenarios and requirements of in-coverage, partial coverage, and out-of-coverage positioning use cases", 3GPP TSG RAN Meeting #88e, Electronic Meeting, Jun. 29-Jul. 3, 2020, RP-201384, total 4 pages.
3rd Generation Partnership Project; Technical Specification Group Radio Access Network; NR; Radio Resource Control (RRC) protocol specification (Release 16), 3GPP TS 38.331 V16.3.1 (Jan. 2021), Technical Specification, total 932 pages.
3rd Generation Partnership Project; Technical Specification Group Radio Access Network; LTE Positioning Protocol (LPP) (Release 16), 3GPP TS 37.355 V16.0.0 (Mar. 2020), Technical Specification, total 281 pages.
Ericsson: "On the NR sidelink discovery", 3GPP TSG-RAN WG1 Meeting # ah-1901, Taipei, Taiwan, Jan. 21-25, 2019, R1-1901225, total 3 pages.
3rd Generation Partnership Project; Technical Specification Group Services and System Aspects; Proximity-based services (ProSe); Stage 2 (Release 15), 3GPP TS 23.303 V15.1.0 (Jun. 2018), Technical Specification, total 130 pages.
3rd Generation Partnership Project; Technical Specification Group Services and System Aspects; Universal Geographical Area Description (GAD) (Release 16), 3GPP TS 23.032 V16.0.0 (Jul. 2020), Technical Specification, total 32 pages.

* cited by examiner 1601a
1603a Processor
1605a Transceiver
1607a Memory 1601a
1604
Uu
1620

1620
1613 Processor
1615 Transceiver
1617 Memory sidelink
1602
1601b

1601b
Processor 1603b
Transceiver 1605b
Memory 1607b

1700

METHOD AND APPARATUS FOR SIDELINK POSITIONING

CROSS-REFERENCE TO RELATED APPLICATIONS

This application is a continuation of International Application No. PCT/EP2021/050772, filed on Jan. 15, 2021, the disclosure of which is hereby incorporated by reference in its entirety.

TECHNICAL FIELD

The present disclosure relates to techniques for sidelink positioning. The disclosure particularly relates to providing a location reference information on a sidelink.

BACKGROUND

3GPP (3rd Generation Partnership Project) has developed radio solutions for positioning services since release 9. For current radio access technology (RAT) dependent positioning techniques in long term evolution (LTE) and new radio (NR), positioning measurements are obtained based on the reference signals transmitted in the downlink and/or uplink between a target device and one or multiple network device (s), for example, reference base station(s). This limits the application of RAT-dependent location service (LCS) within the coverage of the cellular mobile network. For the next generation LCS, use cases for User Equipments (UEs) in partial coverage and out-of-coverage scenarios have caught interest, especially for vehicle-to-everything (V2X) and public safety services.

RAT-dependent positioning is currently provided by cellular mobile networks and thus relies on the network deployment, namely fixed installed base stations or transmit-receive-points (TRPs) which are utilized as positioning reference nodes. Typically, the network deployment is optimized in a way that mainly the performance requirements of data communication can be met. For positioning, where coverage from multiple reference nodes is required, a typical network deployment for communication may not be sufficient.

SUMMARY

It is an objective of this disclosure to provide UE-based location reference techniques and corresponding signalling techniques that provide reliable and highly available positioning measurements in communication networks, e.g. for communication over the 5G mobile radio network. It is a particular objective of this disclosure to provide a mechanism for providing a location reference UE for a target UE.

One or more of these objectives is achieved by the features of the independent claims. Further embodiment forms are apparent from the dependent claims, the description and the figures.

A basic idea of this disclosure is to provide a scheme for a user device to indicate its availability as a location reference. The scheme may include the following operations:

1) configure a UE-type location reference device to transmit a location reference indication message and configure the target UEs to receive accordingly;
2) indicate the availability of a location reference UE to its vicinity;
3) In some embodiments, update the location information and check the status of the location reference UE.

This disclosure defines a prerequisite operation for RAT dependent positioning to exploit sidelink measurements. Allowing UE-type devices to serve as location references, it offers the potential to provide location service in partial/out-of-coverage scenario and improves the availability of location service. Even for typical in-coverage scenarios, the disclosed scheme allows for dynamic activation of UE-type location references, leading to reduced power consumption and lower deployment cost. The UE-type location references with sidelink positioning measurements can be combined with any network-based or UE-based positioning method and adds flexibility to the location service offered by current cellular mobile systems.

According to a first embodiment, the disclosure relates to a first user device, comprising: a transceiver, configured to receive a location reference indication configuration to configure the first user device to transmit or receive an indication message; and transmit or receive an indication message over a sidelink, wherein the indication message is indicative of a location reference available on the sidelink for positioning assistance.

Such a first user device supports UE-based location reference service and the corresponding signalling to provide reliable and highly available positioning measurements in communication networks, e.g. for communication over the 5G mobile radio network. The first user device advantageously supports discovering of a location reference UE by a target UE.

The first user device may act as a location reference device transmitting the indication message or it may act as a target user device (hereinafter referred to as second user device) receiving the indication message. If the first user device acts as a target user device, it will receive location reference indication configuration from network and receive indication message from a location reference device. Both cases are included in this first embodiment.

A location reference as described in this disclosure is a reference for a location in a coordinate system. The location reference can be defined by a geographic coordinate system, i.e. either a global coordinate system associated with positions on Earth or a local coordinate system associated with positions relative to a device. The location reference can define an absolute geographic position that can be used by other devices to determine their geographic position based on this location reference.

It should be understood that the first user device, in some scenarios, acts as a transmitting device (or a location reference UE), but, in some other scenarios, acts as a receiving device (or a target UE). In some scenarios, the first user device may act as both a transmitting device and a receiving device. The present disclosure may treat the first user device as both transmitting device and receiving device, but it should be understood that the first user device may act as only transmitting device or receiving device. The first user device may refer as UE (User Equipment) in the present disclosure. The same applies for the second user device.

Sidelink or sidelink communication according to the disclosure is an adaptation of the core LTE standard that allows for communication between two or more nearby devices, using E-UTRAN technology (Evolved UMTS Terrestrial Radio Access Network) without a base station. This technology can be used for the out-of-network coverage scenario. The functionality can also be used in conjunction with conventional LTE connections to mobile networks to open-up a wide variety of innovative connected car services, factory automation services, etc.

In an embodiment of the first user device, the first user device is configured to be a location reference device and provide the indication message over the sidelink for a second user device and a measurement reference of positioning for the second user device.

This provides the advantage that a second user device is informed about the availability of a location reference device for positioning measurements by such first user device. In particular, in out-of-coverage scenarios without connection to a base station, the second user device can exactly determine its position with the assistance of the first user device and without a base station. This improves availability and security in connected car services, factory automation services, etc.

The second user device can be a plurality of user devices for which the first user device serves as location reference.

In an embodiment of the first user device, the transceiver is configured to receive the location reference indication configuration via a dedicated signaling, a broadcast signaling, or a groupcast signaling.

This provides the advantage that the location reference indication configuration can be flexibly provided, e.g. as unicast, broadcast, groupcast, etc. depending on the respective scenario.

The location reference indication configuration can be either UE-specific or non-UE-specific. In case of UE-specific configuration, the location server informs the location reference device (and the target user device) about the configuration parameters of an indication message respectively, e.g. as shown in FIG. 4 described below. In case of non-UE-specific configuration, the configuration parameters may be transferred to the Radio Access Network (RAN) and then further broadcasted to the target user device(s), e.g. as shown in FIG. 5 described below.

In an embodiment of the first user device, the first user device is configured to provide the measurement reference of positioning for the second user device by: transmitting a positioning reference signal, PRS, over the sidelink to provide the measurement reference of positioning for the second user device; or measuring a reference signal, RS, transmitted by the second user device for usage as the measurement reference of positioning.

This provides the advantage that the measurement of positioning can be flexibly performed, either by the first user device or by the second user device.

In an embodiment of the first user device, the indication message comprises at least one of the following: a location reference identity (ID) of the first user device; an indication whether the first user device is able to assist absolute positioning of a second user device; an indication whether the first user device is capable to transmit positioning reference signals (PRSs) over sidelink; an indication whether the first user device is capable to carry out positioning measurement on sidelink; location information indicating the second user device whether the first user device is able to assist the second user device in positioning; an indication of a time duration for which the information provided in the indication message is valid, a PRS capability level indicative of a supported level of the PRS sidelink transmission, a measurement capability level indicative of a level of the positioning measurement on sidelink, and a location information accuracy level indicative of an accuracy level of the location information from the first user device. This information corresponds to the parameters of Table 2 and additionally the parameters for the basic information according to the Table 2A as described below.

This provides the advantage that the second user device is informed about all relevant parameters that may be important for enabling the location reference service between first user device and second user device.

In an embodiment of the first user device, the indication whether the first user device is capable to transmit positioning reference signals over sidelink comprises at least one of: a number of antennas, panels and/or antenna reference points (ARPs), a position of the antennas, panels and/or ARPs; a maximum bandwidth; supported frequency bands; and a maximum transmit power per antenna, panel and/or ARP. This information corresponds to "PRS capability" section of Table 2 as described below.

This provides the advantage that the second user device is informed about all relevant communication and transmission resources of the first user device in order to enable the second user device to decide whether or how to use the first user device as a location reference.

In an embodiment of the first user device, the indication on whether the first user device is capable to carry out positioning measurement on the sidelink comprises at least one of: a reference signal time difference (RSTD), a reference signal receive power (RSRP), a number of antennas, panels and/or antenna reference points (ARPs); a position of the antennas, panels and/or ARPs; a maximum bandwidth, supported frequency bands, and maximum transmit power. This information corresponds to "Positioning measurement capability" section of Table 2 described below.

This provides the advantage that the second user device can be efficiently informed about all relevant position measurement capabilities of the first user device in order to decide whether or how to use the first user device as a location reference.

In an embodiment of the first user device, the location information comprises at least one of: location coordinates of the first user device including uncertainty information of location estimation, a velocity estimate of the first user device, including speed, bearing information and uncertainty information of the velocity estimate, location source positioning technology, in particular GNSS, WLAN, radio, a location time stamp indicating time when the location estimate is valid, an indication whether the first user device is a location reference, a valid time duration of the location information. This information corresponds to "Location information" section of Table 2 as described below and more particularly to the parameters in Table 3 describing the location information in detail.

This provides the advantage that the second user device can be efficiently informed about all details of the location information associated with the first user device in order to decide whether or how to use the first user device as a location reference.

In an embodiment of the first user device, the indication message is transmitted via unicast to the second user device or via groupcast to a group of user devices, or via broadcast to a group of user devices.

This provides the advantage that the indication message can be flexibly transmitted to the second user device or one or more groups of second user devices depending on the respective scenario.

In an embodiment of the first user device, the indication message is carried in one of: a Physical Sidelink Broadcast Channel (PSBCH), a Physical Sidelink Shared Channel (PSSCH), a Physical Sidelink Control Channel (PSCCH), a Medium Access Control-Control Element (MAC-CE), a PC5-RRC interface for sidelink communication.

This provides the advantage that the indication message can be flexibly carried in different channels depending on their availability.

In an embodiment of the first user device, the indication message comprises at least a first part and a second part, and wherein the first part of the indication message and the second part of the indication message are transmitted in separate messages.

This provides the advantage that the indication message can be efficiently transmitted to the second user device, for example in a first part where only basic information is transmitted and in a second part where all detailed information is transmitted.

In an embodiment of the first user device, the first part of the indication message comprises at least one of: the location reference identity of the first UE, the indication on whether the first user device is capable to assist absolute positioning of a second user device, the PRS capability level indicative of a supported level of the PRS sidelink transmission, the measurement capability level indicative of a level of the positioning measurement on sidelink, and the location information accuracy level indicative of an accuracy level of the location information from the first user device.

This provides the advantage that the second user device is able to quickly decide based on the first part whether the first user device can be used as a location reference. The first part can be bandwidth efficiently transmitted to the second user device.

In an embodiment of the first user device, the transceiver is configured to receive a location information request, wherein the location information request is used to update a status of the first user device to be used as location reference device for the second user device.

This provides the advantage that the status of the first user device is always up-to-date and the second user device can be informed of the current status of the first user device.

In an embodiment of the first user device, the location information request comprises at least one of: location coordinates of the first user device including uncertainty information of location estimation, a velocity estimate of the first user device, including speed, bearing information and uncertainty information of the velocity estimate, information on a location source positioning technology, e.g. GNSS, WLAN, radio, a location time stamp indicative of a time when the location estimate is valid, an indication on whether the first user device is a location reference, and a valid time duration of the location information.

This provides the advantage that the first user device can provide the relevant parameters as location reference and thus, the second user device can decide based on these parameters whether to use the first user device as location reference.

In an embodiment of the first user device, the transceiver is configured to send a location information update to a network device, wherein the location information update is used to update a status of the first user device to be used as location reference device for the second user device.

This provides the advantage that the network device, e.g. a base station, is informed about the current status of the first user device as location reference.

The message may not depend on the location information request and may be sent automatically by the first user device. Then, the network device may be periodically informed about the status of the first user device as location reference.

In an embodiment of the first user device, the first user device comprises a processor configured to trigger the status updating of the first user device based on at least one of: a location reference update carried out at a location server; and a location reference update carried out at the first user device.

This provides the advantage that the update can be flexible performed at a location server or at the first user device depending on the scenario.

In an embodiment of the first user device, the location reference update comprises at least one of: a parameter indicating whether the first user device carries out the update, update timing information indicating when or how often the first user device carries out the update, and parameters to be updated. This is the information according to Table 4 as described below.

This provides the advantage that the update can be flexible performed and the second user device is informed about the detailed update procedure.

In an embodiment of the first user device, at least one of the location information request and the location information update is received from a Location Management Function (LMF) via LTE positioning protocol (LPP) or new radio positioning protocol annex (NRPPa).

This provides the advantage that the update can be efficiently performed in 5G systems.

In an embodiment of the first user device, the location reference indication configuration is received via at least one of: LTE positioning protocol (LPP) new radio positioning protocol annex (NRPPa) or radio resource control, RRC, protocol.

This provides the advantage that the location reference indication configuration can be efficiently signaled in 5G systems.

According to a second embodiment, the disclosure relates to a network device, comprising: a processor, configured to obtain a location reference indication configuration, wherein the location reference indication configuration is used to configure a first user device to transmit or receive an indication message over a sidelink to or from a second user device, wherein the indication message is indicative of a location reference available on the sidelink for positioning assistance; and a transceiver, configured to transmit the location reference indication configuration to the first user device.

The network device may be a device in the radio access network or in the radio core network, for example. The network device may be a server or a base station, for example, or any other network entity.

Such a network device supports UE-based location reference service and the corresponding signalling to provide reliable and highly available positioning measurements in communication networks, e.g. for communication over the 5G mobile radio network. The network device advantageously supports discovering of a location reference UE by a target UE.

In an embodiment of the network device, the indication message comprises at least one of the following: a location reference identity of the first user device; an indication on whether the first user device is capable to assist absolute positioning of a second user device; an indication on whether the first user device is capable to transmit positioning reference signals (PRSs) over the sidelink; an indication on whether the first user device is capable to carry out positioning measurement on the sidelink; location information indicating the second user device whether the first user device is able to assist the second user device in positioning;

an indication of a time duration for which the information provided in the indication message is valid, a PRS capability level indicative of a supported level of the PRS sidelink transmission, a measurement capability level indicative of a level of the positioning measurement on sidelink, and a location information accuracy level indicative of an accuracy level of the location information from the first user device. This information corresponds to the parameters of Table 2 as described below and additionally the parameters for the basic information according to Table 2A described below.

This provides the advantage that the second user device is informed about all relevant parameters that may be important for enabling the location reference service between first user device and second user device.

In an embodiment of the network device, the transceiver is configured to transmit the location reference indication configuration via a dedicated signaling, a broadcast signaling, or a groupcast signaling.

This provides the advantage that the location reference indication configuration can be flexible provided, e.g. as unicast, broadcast, groupcast, etc. depending on the respective scenario.

In an embodiment of the network device, the location reference indication configuration is received via at least one of: LTE positioning protocol (LPP) new radio positioning protocol annex (NRPPa) or radio resource control (RRC) protocol.

This provides the advantage that the location reference indication configuration can be efficiently signaled in 5G systems.

According to a third embodiment, the disclosure relates to a method for indicating a location reference for positioning assistance, the method comprising: receiving, by a first user device, a location reference indication configuration; based on the location reference indication configuration, configuring the first user device to transmit or receive an indication message; and transmitting or receiving, by the first user device, the indication message over a sidelink, wherein the indication message is indicative of a location reference available on the sidelink for positioning assistance.

This provides the same advantages as described above for the first embodiment.

According to a fourth embodiment, the disclosure relates to a method for providing a location reference indication configuration for positioning assistance, the method comprising: obtaining, by a network device, a location reference indication configuration, wherein the location reference indication configuration is used to configure a first user device to transmit or receive an indication message over a sidelink to or from a second user device, wherein the indication message is indicative of a location reference available on the sidelink for positioning assistance; and transmitting, by the network device, the location reference indication configuration to the first user device.

This provides the same advantages as described above for the second embodiment.

According to a fifth embodiment, the disclosure relates to a computer program product including computer executable code or computer executable instructions that, when executed, causes at least one computer to execute the method according to the third embodiment or the method according to the fourth embodiment. Such a computer program product may include a non-transient readable storage medium storing program code thereon for use by a processor, the program code comprising instructions for performing the methods or the computing blocks as described hereinafter.

The computer program product may run on any of the components of a communication system described below with respect to FIG. 16. For example, the computer program product may run on a first user device 1601*a* as shown in FIG. 16. Such a first user device may comprises a processing circuitry 1603*a* for instance, a processor 1603*a*, for processing and generating data, e.g. the program code described above, a transceiver 1605*a*, including, for instance, an transmitter, a receiver and an antenna, for exchanging data with the other components of the communication system 1600, and a non-transitory memory 1607*a* for storing data, e.g. the program code described above. The computer program product may also run on a second user device 1601*b* as shown in FIG. 16. The computer program product may also run on a network device 1620 as shown in FIG. 16.

Using such a computer program product improves positioning measurements and availability of positioning measurements in radio communication networks, e.g. such as transmission over the 5G radio network.

According to a sixth embodiment, the disclosure relates to a computer-readable medium storing instructions that, when executed by a computer, cause the computer to execute the method according to the third embodiment or the method according to the fourth embodiment. Such a computer readable medium may be a non-transient readable storage medium. The computer may be, for example, a first user device, e.g. the first user device according to the first embodiment comprising a processor, a transceiver and a memory. The computer-readable medium may be stored in the memory of the first user device. The instructions stored on the computer-readable medium may be executed by the processor of the first user device. The computer may be, for example, a network device, e.g. the network device according to the second embodiment comprising a processor, a transceiver and a memory. The computer-readable medium may be stored in the memory of the network device. The instructions stored on the computer-readable medium may be executed by the processor of the network device.

The sections described hereinafter provide details of the disclosed technique for a UE-type device to indicate its availability as a location reference. The signaling procedures between a location server and a location reference UE or a target UE are presented. The location server described in this disclosure is responsible of location reference management. This functionality may be implemented either in the same entity for location determination or independent from the location determination entity. The location server can be implemented as functionality of a network function, such as the LMF; it can also be implemented as an application server or an application function. For the former, new LPP IEs are introduced to enable the configuration, indication and update of the location reference UE; for the latter, Hypertext Transfer Protocol (HTTP) or other application layer protocol can be adopted to convey the signaling information. Also, the disclosure does not exclude other format of embodiments for the location server, such as a location management function located in a serving base station, in a RAN node, in the core network or in a UE-type device such as handheld terminals or mobile vehicles. For each embodiment possibility, the disclosed signaling procedures are carried using different communication protocols correspondingly.

BRIEF DESCRIPTION OF THE DRAWINGS

Further embodiments of the disclosure will be described with respect to the following figures, in which.

DETAILED DESCRIPTION OF EMBODIMENTS

Figure 1:
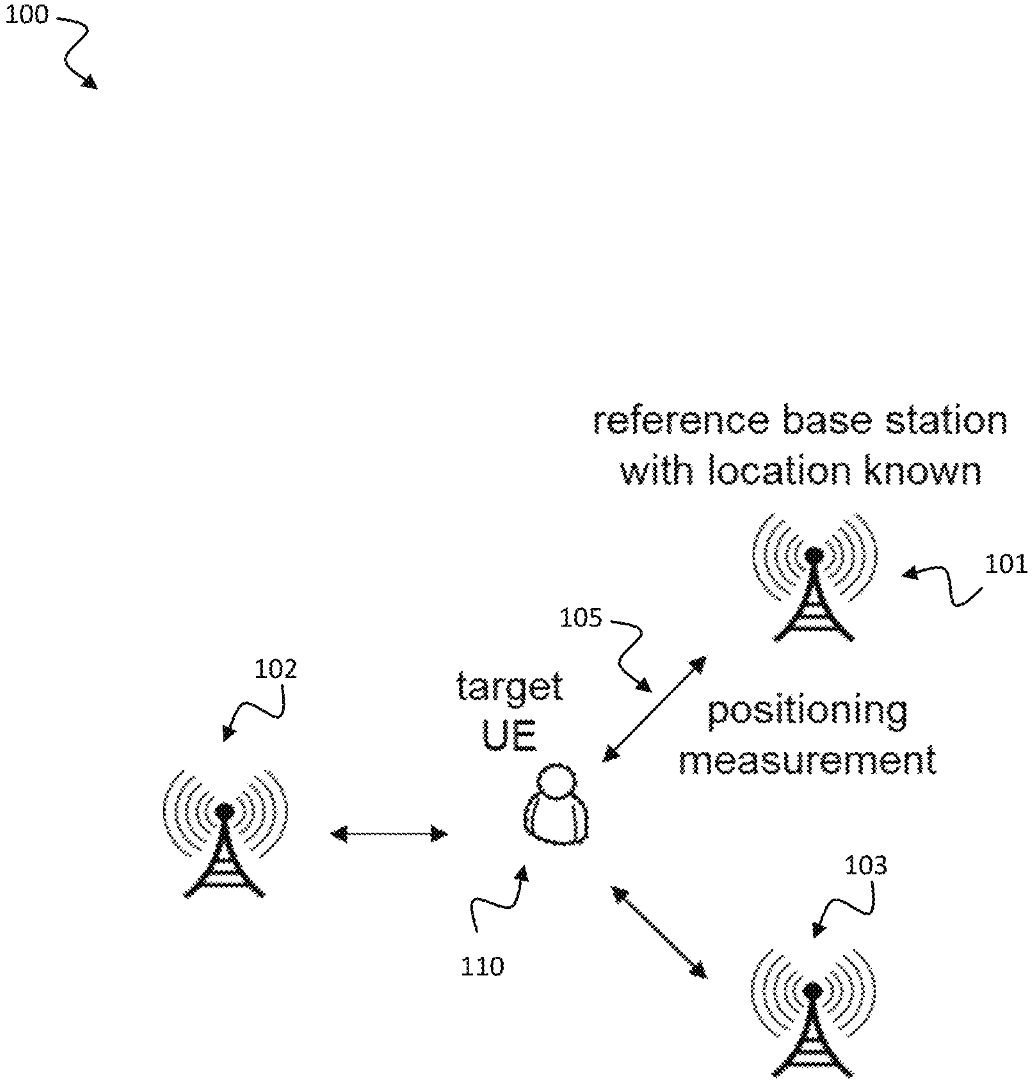
FIG. 1 shows a schematic diagram illustrating radio access technology (RAT) dependent positioning 100.

In order to describe the disclosure in detail, the following terms, abbreviations and notations will be used:

UE user equipment
RAT radio access technology
LTE long term evolution
NR new radio
LCS location service
V2X vehicle-to-everything
TRP transmit-receive point
PRS positioning reference signal
ARP antenna reference point
RS reference signal
RSRP reference signal receive power
RSTD reference signal time difference
GNSS global navigation satellite system
WLAN wireless local area network
LMF location management function
LPP LTE positioning protocol
BWP bandwidth part
NRPPa new radio positioning protocol a
SIB system information block
PSBCH physical sidelink broadcast channel
PSSCH physical sidelink shared channel
PSCCH physical sidelink control channel
MAC CE medium access control control element
PC5-RRC PC5 radio resource control
ID identity
LMF location management function
AMF access and mobility management function
HTTP hypertext transfer protocol
IE information element
RAN radio access network In the following detailed description, reference is made to the accompanying drawings, which form a part thereof, and in which is shown by way of illustration embodiments in which the disclosure may be practiced. It is understood that other embodiments may be utilized and structural or logical changes may be made without departing from the scope of the present disclosure. The following detailed description, therefore, is not to be taken in a limiting sense, and the scope of the present disclosure is defined by the appended claims.

It is understood that comments made in connection with a described method may also hold true for a corresponding device or system configured to perform the method and vice versa. For example, if a method operation is described, a corresponding device may include a unit to perform the described method operation, even if such unit is not explicitly described or illustrated in the figures. Further, it is understood that the features of the various embodiments described herein may be combined with each other, unless noted otherwise.

The methods, devices and systems described herein may be implemented in radio network, in particular LTE, 5G, or 5G beyond. The described devices may include integrated circuits and/or passives and may be manufactured according to various technologies. For example, the circuits may be designed as logic integrated circuits, analog integrated circuits, mixed signal integrated circuits, optical circuits, memory circuits and/or integrated passives.

The devices described herein may be configured to transmit and/or receive radio signals. Radio signals may be or may include radio frequency signals radiated by a radio transmitting device (or radio transmitter or sender). However, devices described herein are not limited to transmit and/or receive radio signals, also other signals designed for transmission in deterministic communication networks may be transmitted and/or received.

The devices and systems described herein may include processors or processing devices, memories and transceivers, i.e. transmitters and/or receivers. The term "processor" or "processing device" describes any device that can be utilized for processing tasks (or blocks or operations). A processor or processing device can be a single processor or a multi-core processor or can include a set of processors or can include means for processing. A processor or processing device can process software or firmware or applications etc.

The devices and systems described herein may include transceivers or transceiver devices. A transceiver is a device that is able to both transmit and receive information or signal through a transmission medium, e.g. a radio channel. It is a combination of a transmitter and a receiver, hence the name transceiver. Transmission is usually accomplished via radio waves. By combining a receiver and transmitter in one consolidated device, a transceiver allows for greater flexibility than what either of these could provide individually.

In the present disclosure, the device may be referred to as user device in some embodiments, and a device may be, for example, a mobile phone, an intelligent terminal, a tablet computer (tablet), a notebook computer (laptop), a video game console, a multimedia player, vehicle, device to device (D2D) equipment, or any smart device which supports a positioning function. The user device may also be referred to as user equipment (UE) in some embodiments of the present disclosure.

FIG. 1 shows a schematic diagram illustrating RAT (radio access technology) dependent positioning 100.

In current radio access technology (RAT) dependent positioning techniques, positioning measurements 105 are obtained based on the reference signals transmitted in the downlink and/or uplink between a target device 110 and one or multiple network device(s), for example, reference base station(s) 101, 102, 103. This limits the application of RAT-dependent location service (LCS) 100 within the coverage of the cellular mobile network.

A target User Equipment (UE) 110 is reachable by a number of three radio cells, e.g. base stations 101, 102, 103. In this example, the first base station is a reference base station with known location. The known location may have been acquired by a GPS receiver or by a stored information storing a fixed position of the base station, e.g. for a base station that is mounted at a fixed location.

A positioning measurement 105 can be initiated between the first base station 101 and the target UE 110 to determine the location of the target UE 110. The base station 101 may for example determine a signal strength of a reference signal transmitted by the target UE and an angle of arrival. Based on this information, the position of the target UE 110 can be determined with respect to the position of the reference base station 101.

Another possibility to determine the location of the target UE 110 is by using triangulation or trilateration techniques based on reference signals transmitted between the target UE 110 and the three base stations 101, 102, 103. The three base stations 101, 102, 103 are used as reference base stations.

Figure 2:
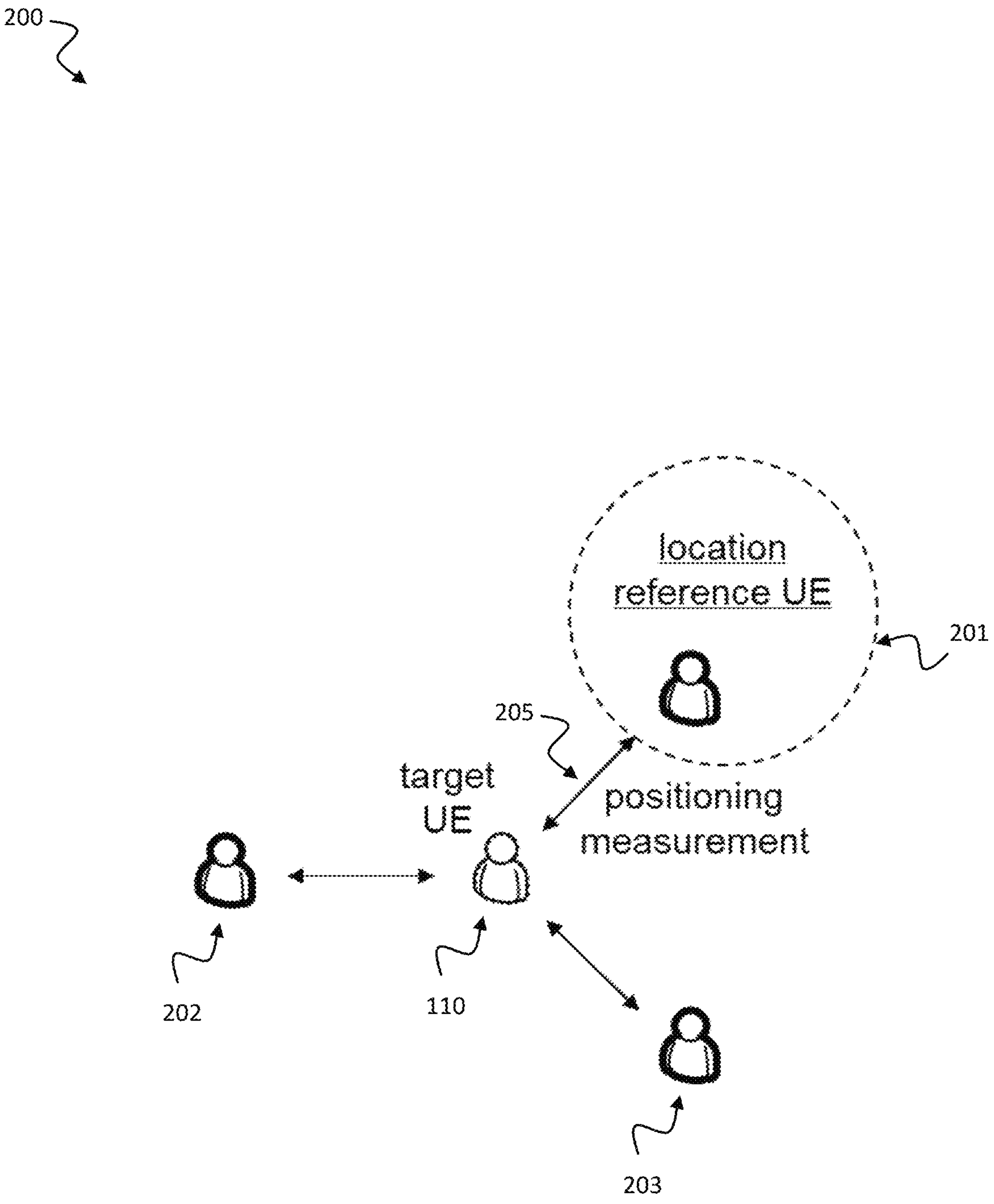
FIG. 2 shows a schematic diagram illustrating sidelink positioning 200 with assistance of location reference UEs according to an example.

FIG. 2 shows a schematic diagram illustrating sidelink positioning 200 with assistance of location reference UEs according to an example.

Sidelink transmission and reception has been developed in 3GPP NR to support in-coverage, partial coverage and out-of-coverage UEs. In order to improve the availability of RAT-dependent positioning, positioning measurements 205 over sidelink between two UEs, e.g. 110, 201, are considered.

In FIG. 2, a scenario of sidelink positioning 200 is depicted. The base stations 101, 102, 103 which serve as location references in FIG. 1 are replaced with one or more location reference UEs 201. Positioning measurements 205 are obtained based on the reference signal transmitted between the target UE 110 and each of the location reference UEs 201.

Note that, in FIG. 2, only UE 201 is referred to as location reference UE. However, the other UEs 202, 203 may be configured as location reference UE as well. The relative position between the target UE 110 and the location reference UE 201 can be further determined. If the position of the location reference UE 201 is known or to some extent known, the absolute position of the target UE 110 can be determined correspondingly as well.

As a prerequisite operation towards sidelink positioning, this disclosure focuses on the location reference UE 201 and provides a solution for the problem of how a location reference UE 201 can be provided for a target UE 110.

In order to enable a user device to act as a location reference UE, or to use a location reference UE for more accurate positioning, a solution is provided in one embodiment. A first user device may receive a location reference indication configuration, wherein the location reference indication configuration may be used to configure the first user device to transmit or receive an indication message. The first user device may transmit or receive an indication message over a sidelink, wherein the indication message may be used to indicate a location reference is available on the sidelink for positioning assistance.

It should be understood that a first user device is also a user device and "first" here is used for the purpose of clarity. A first user device may refer to a user device.

In some embodiments, the first user device may act as a location reference UE. The first user device may receive a location reference indication configuration, and the location reference indication configuration may configure the first user device to transmit an indication message over a sidelink. After receiving the location reference indication configuration, the first user device may transmit an indication message over a sidelink. In this scenario, the first user device will provide positioning assistance for other user devices.

In some embodiments, the first user device may act as a target UE. The first user device may receive a location reference indication configuration, and the location reference indication configuration may configure a location reference device (or UE) over the sidelink for the first user device. After receiving the location reference indication configuration, the first user device may receive an indication message over a sidelink. In this scenario, the first user device will be provided with a location reference device for positioning assistance.

The present disclosure will describe the first user device from location reference UE and/or target UE perspective. A first user device may act as a location reference UE in some embodiments and act as a target UE in some other embodiments.

Figure 3:
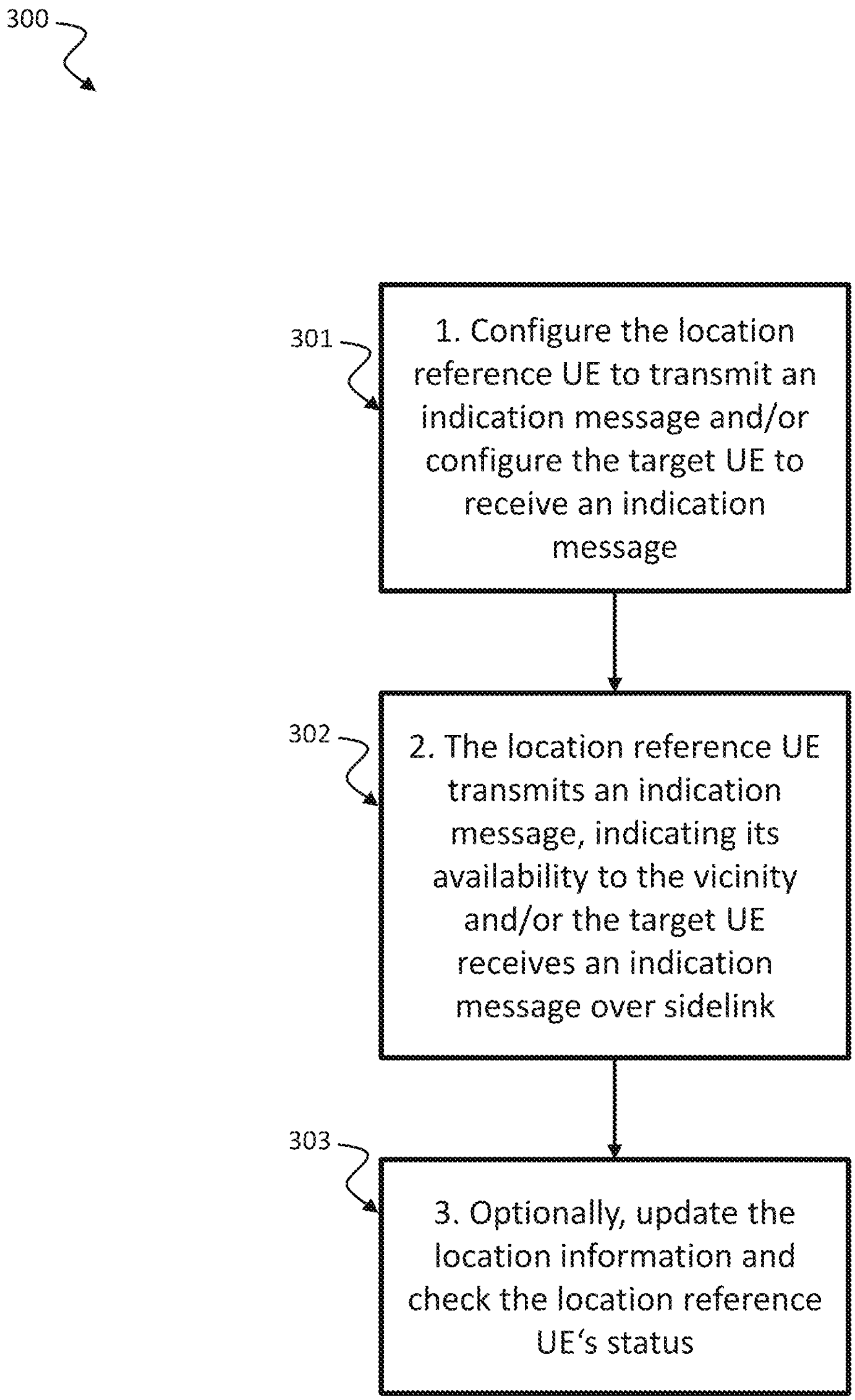
FIG. 3 shows a schematic diagram illustrating a method 300 for a user device to indicate as a location reference according to an example.

FIG. 3 shows a schematic diagram illustrating a method 300 for a user device to indicate as a location reference according to an example.

Assuming a UE-type device, also referred to as user device or simply UE in this disclosure, has been determined to serve as a location reference UE, FIG. 3 presents a method 300 allowing for a user device to indicate its availability as a location reference. The method 300 consists of the three operations, as shown in FIG. 3, i.e.:

Operation 1: Configure the location reference UE to transmit an indication message and/or configure the target UE to receive an indication message;

Operation 2: the location reference UE transmits an indication message, indicating its availability to the vicinity and/or the target UE receives an indication message over sidelink;

Operation 3: In some embodiments, update the location information and check the location reference UE's status.

Figure 8:
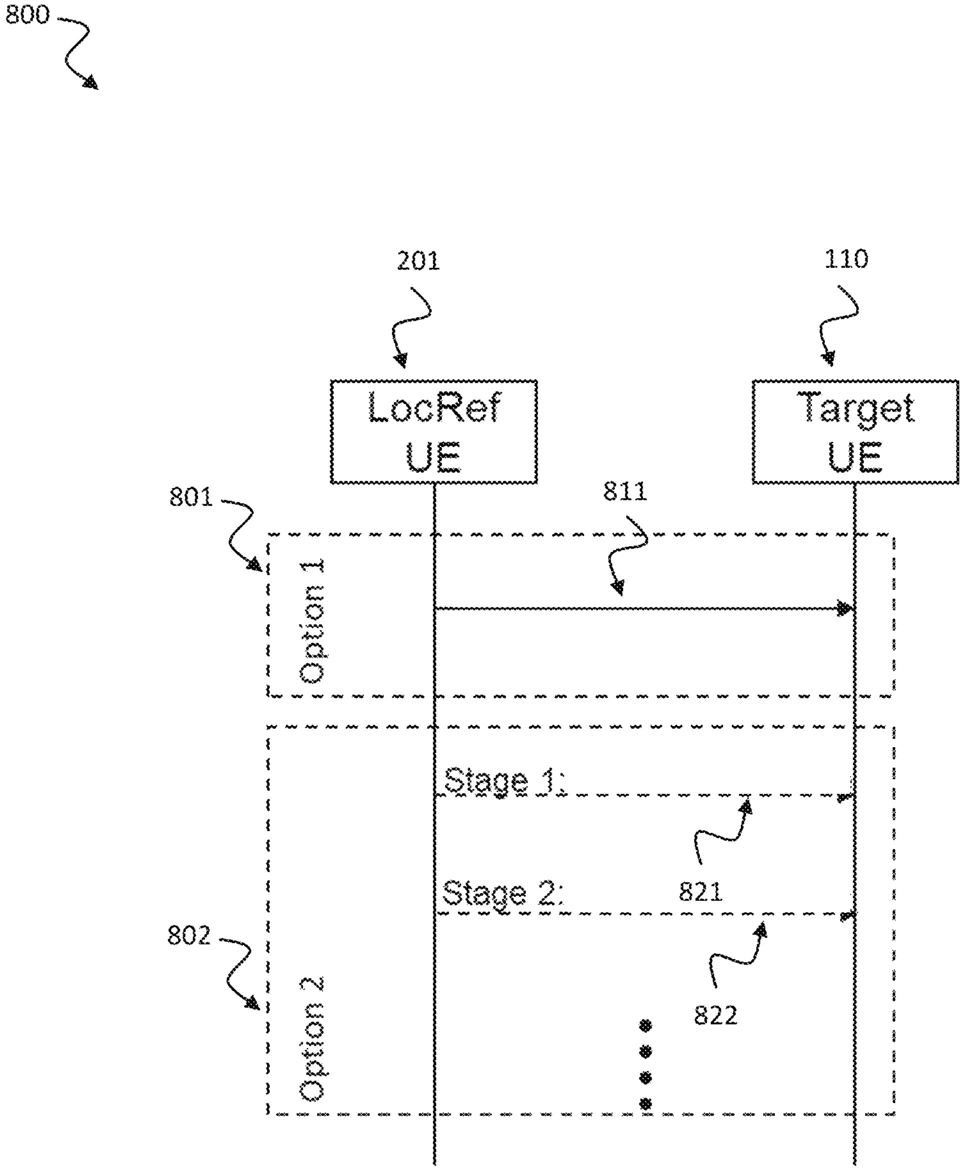
FIG. 8 shows a message sequence chart 800 illustrating location reference indication message transmission according to an example.
Figure 9:
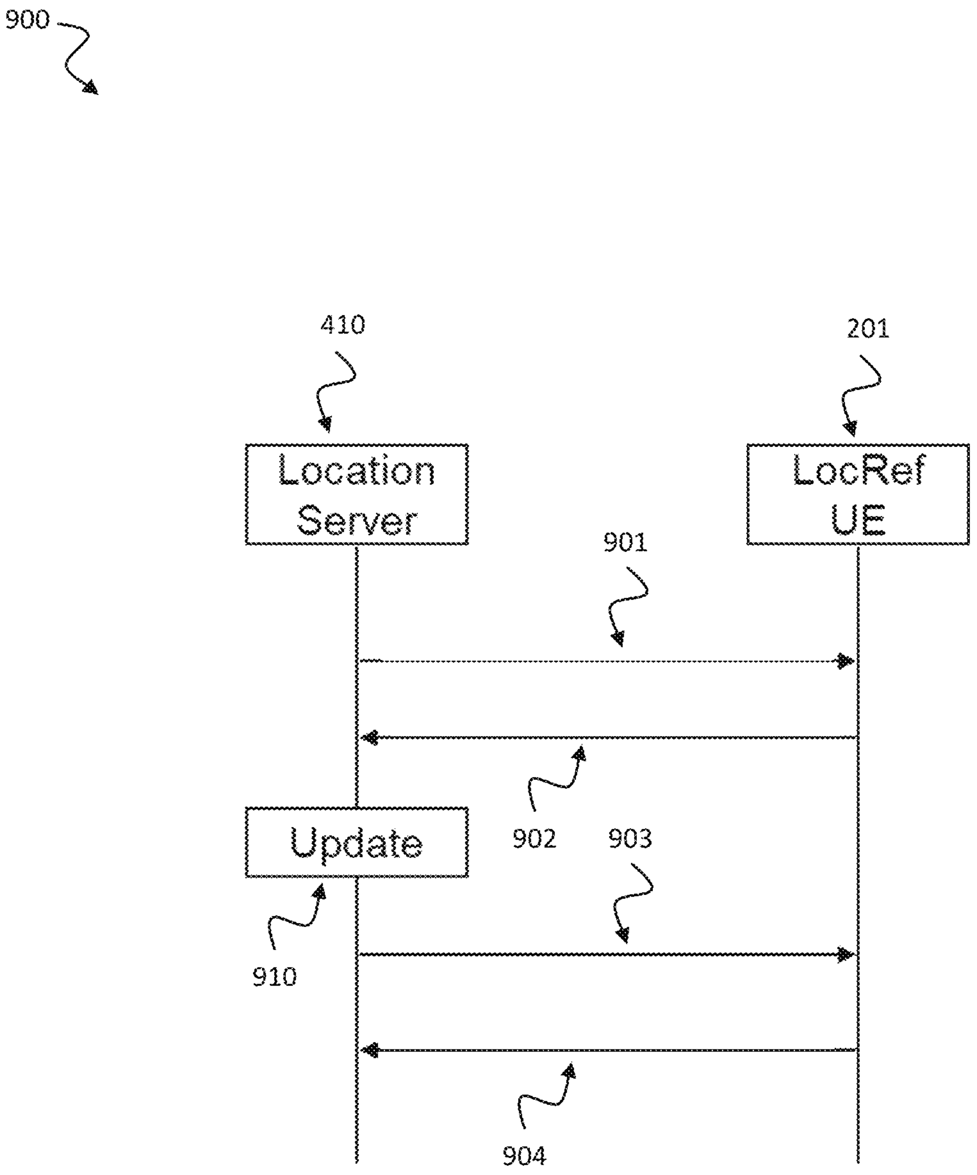
FIG. 9 shows a message sequence chart 900 illustrating location reference UE status update at the location server according to an embodiment.
Figure 10:
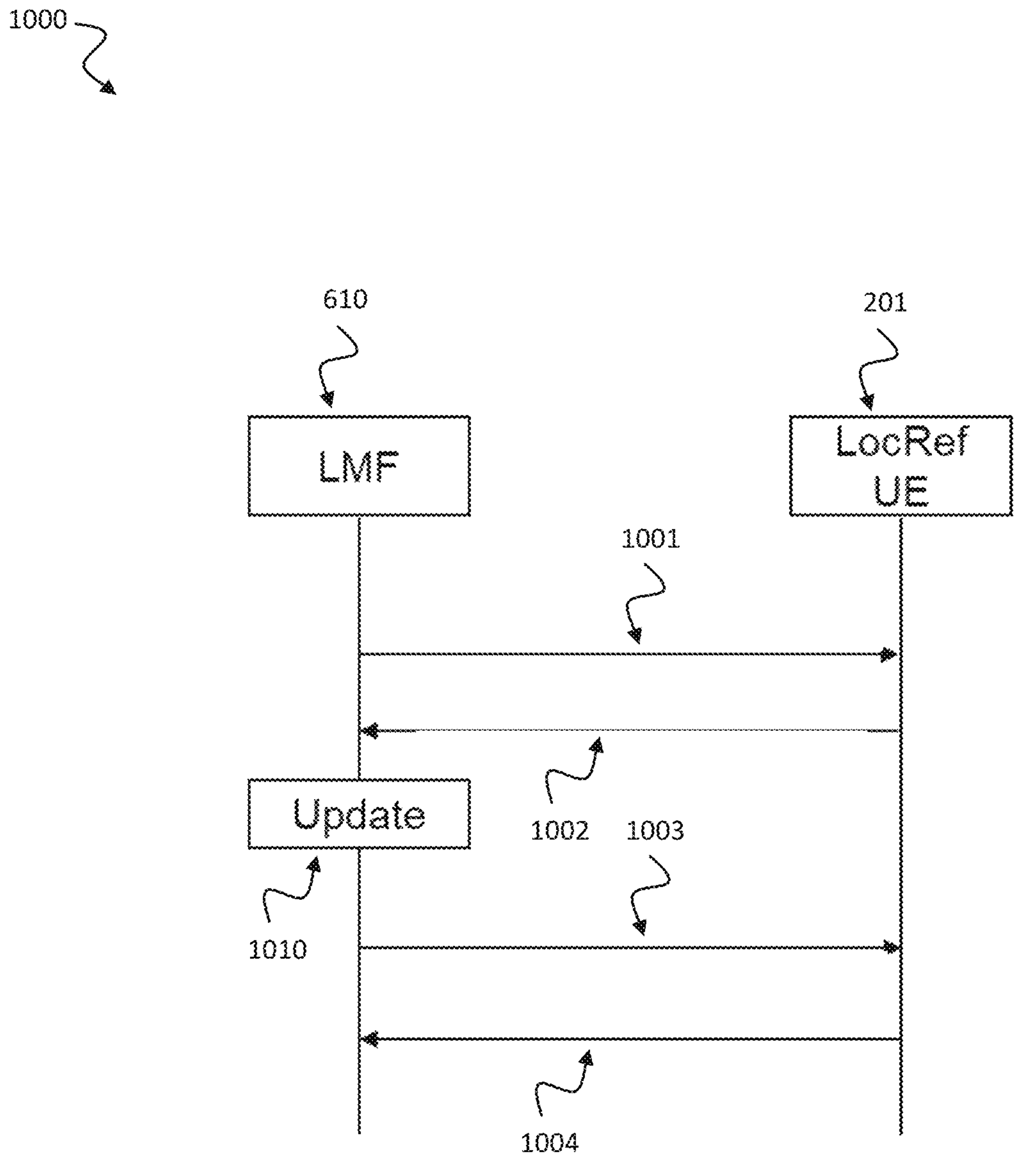
FIG. 10 shows a message sequence chart 1000 illustrating location reference UE status update at the LMF using LPP according to an example.
Figure 11:
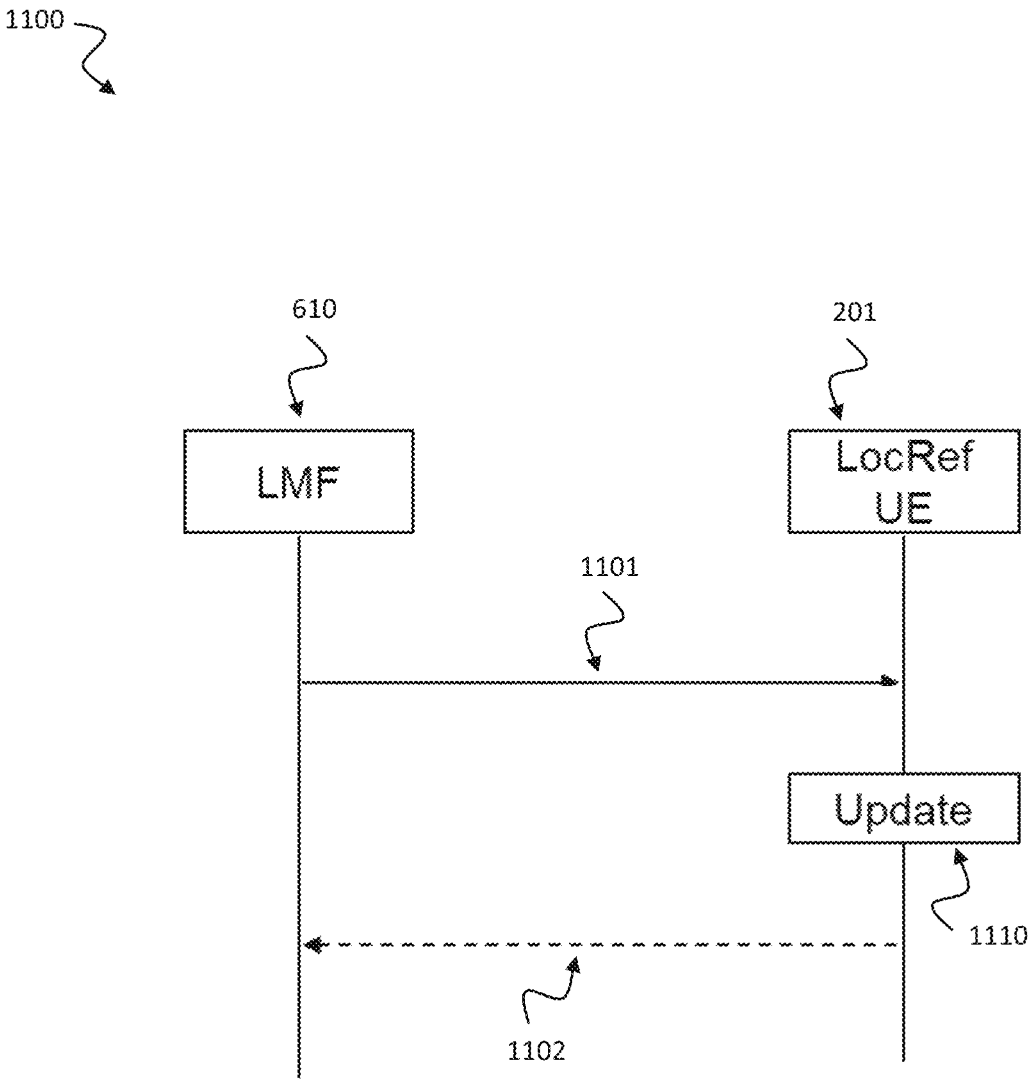
FIG. 11 shows a message sequence chart 1100 illustrating location reference UE status update at the UE according to an example.

In the following sections, these three operations or blocks are elaborated in detail. In particular FIGS. 4 to 7 are related to the configuration operation (Operation 1); FIG. 8 is related to the indication message transmission operation (Operation 2) and FIGS. 9 to 11 are related to the update operation (Operation 3).

1. Configuration

In order fora location reference UE to be discovered by the target UEs, a location reference UE is configured to transmit an indication message, indicating its availability to its vicinity over sidelink. A target UE is configured to listen to the indication message.

The configuration parameters of the location reference indication message may relate to its scheduling information, such as time-frequency resource, periodicity, etc. The time-frequency resource for location reference indication can be pre-configured or dynamically allocated. Examples for time-frequency resource include one or multiple BandWidth Parts (BWP), one or multiple resource pools, subchannels or a number of resource blocks. The allocation of the time-frequency resource may be periodic, semi-persistent or aperiodic.

The configuration parameters of the location reference indication message may also relate to the signal configuration, such as a type or parameter configuration of a transmitted sequence which is used as indication message. For instance, a location reference UE may transmit a synchronization sequence which is initiated using the location reference ID to indicate its identity; or some other sequence which has been agreed with the target UEs for location reference indication.

In some embodiments, for the location reference UEs, the configuration parameters of the location reference indication message may further specify when the indication message transmission starts and/or ends, e.g. at a specific time or triggered by a certain type of events such as change of motion, change of location, timer expires etc.; whether the transmission is periodic, semi-persistent or aperiodic.

The location reference indication configuration is provided to the location reference UEs and/or the target UEs by a location server. However, the location server may obtain the aforementioned configuration parameters from a Radio Access Network (RAN).

For a location reference UE, the indication configuration can be provided before the indication message transmission starts. Alternatively, a UE-type device may obtain the location reference indication configuration in advance and transmit an indication message as configured as a location reference UE once triggered by certain events.

For a target UE, the location reference indication configuration may indicate that an available location reference UEs in its vicinity and/or can be provided upon request or triggered by events, e.g. when a target UE enters a geographical area, when a timer expires or when its motion changes, etc.

Figure 4:
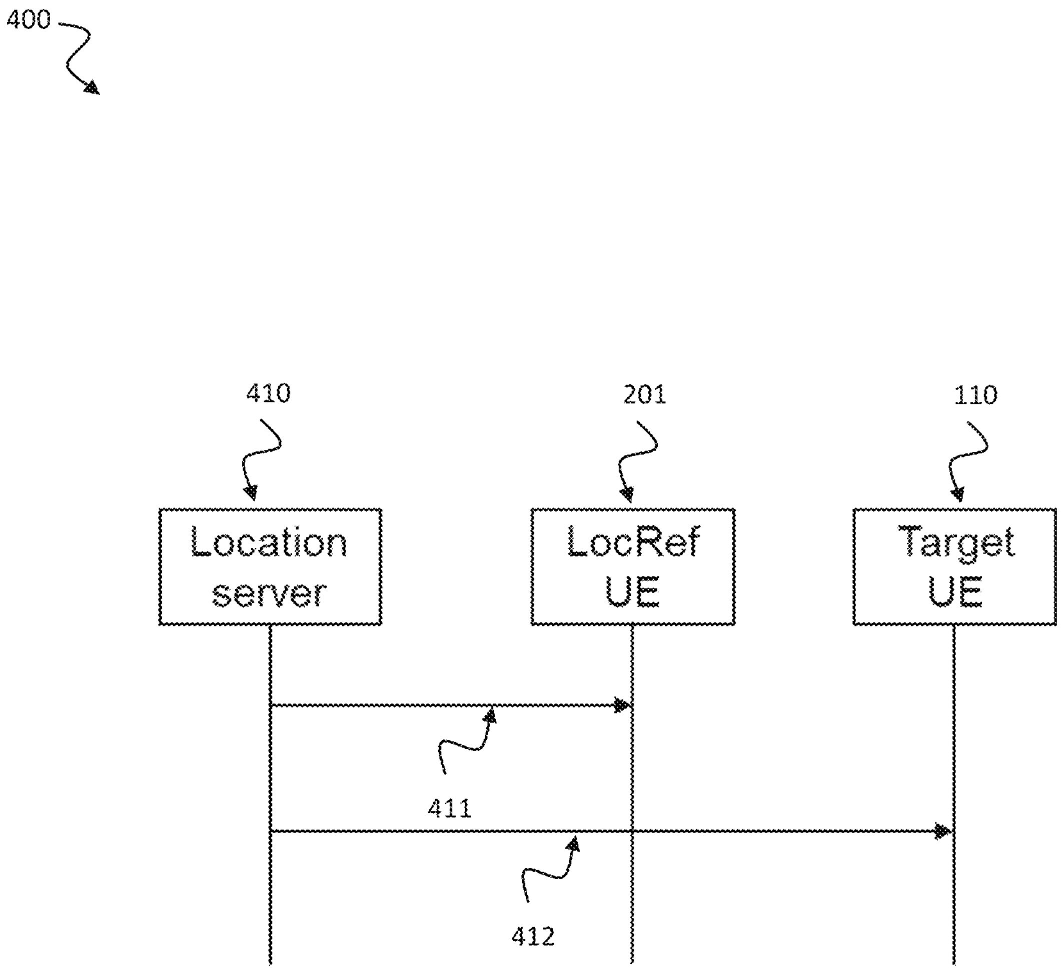
FIG. 4 shows a message sequence chart 400 illustrating UE-specific location reference indication configuration according to an example.
Figure 5:
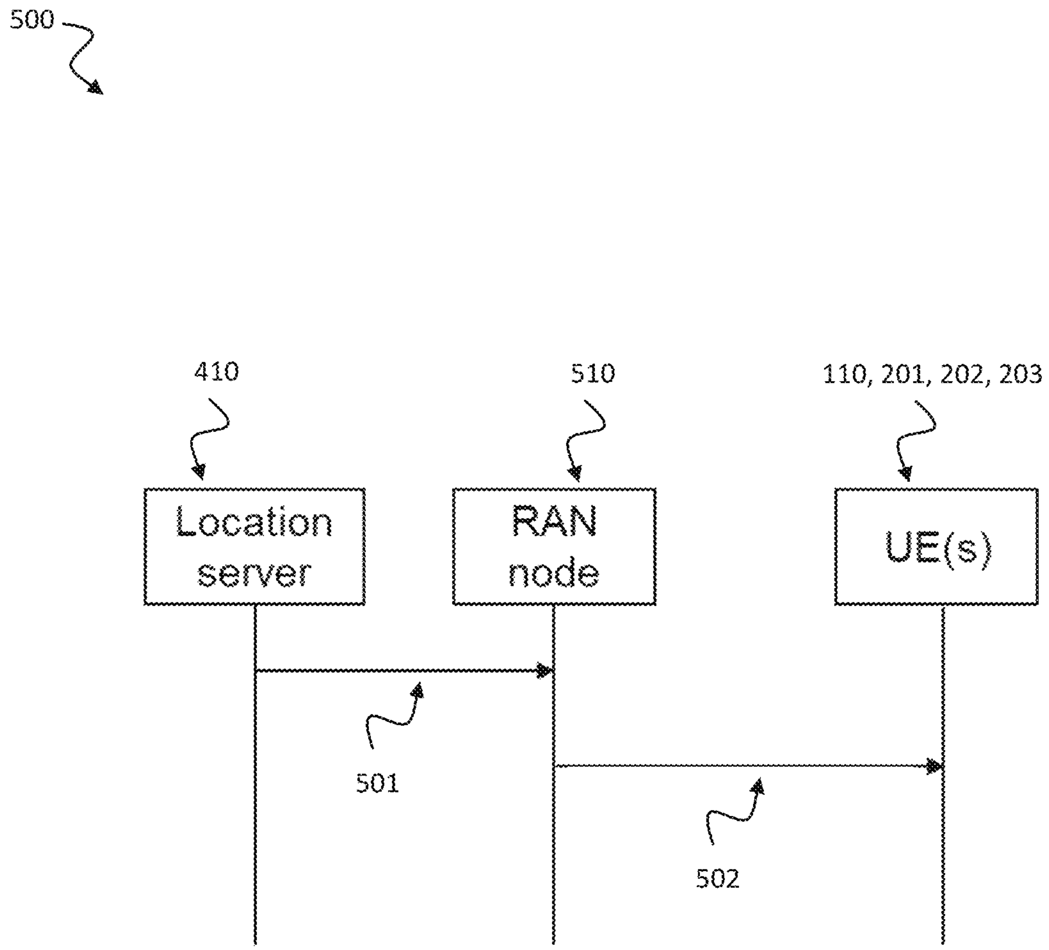
FIG. 5 shows a message sequence chart 500 illustrating non-UE-specific location reference indication configuration according to an example.
Figure 6:
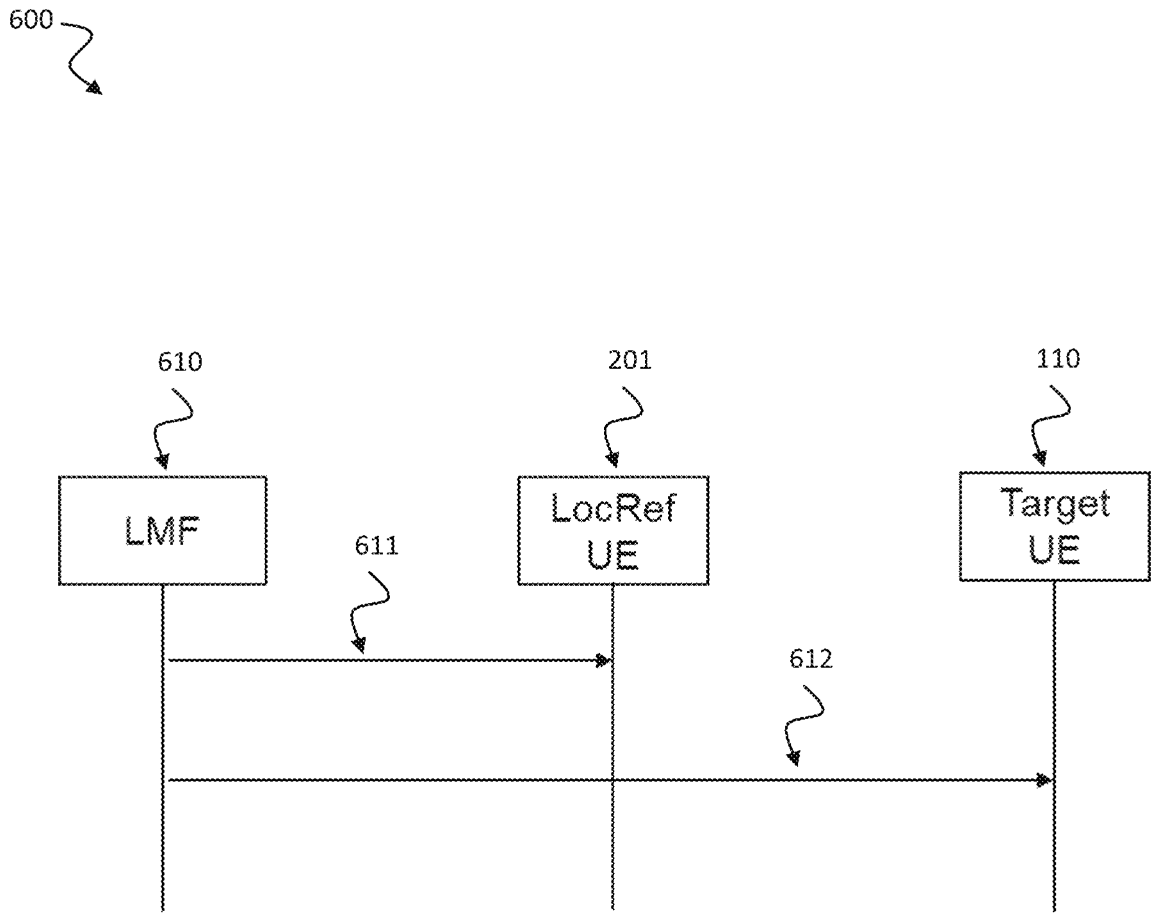
FIG. 6 shows a message sequence chart 600 illustrating UE-specific location reference indication configuration using LTE Positioning Protocol (LPP) according to an example.
Figure 7:
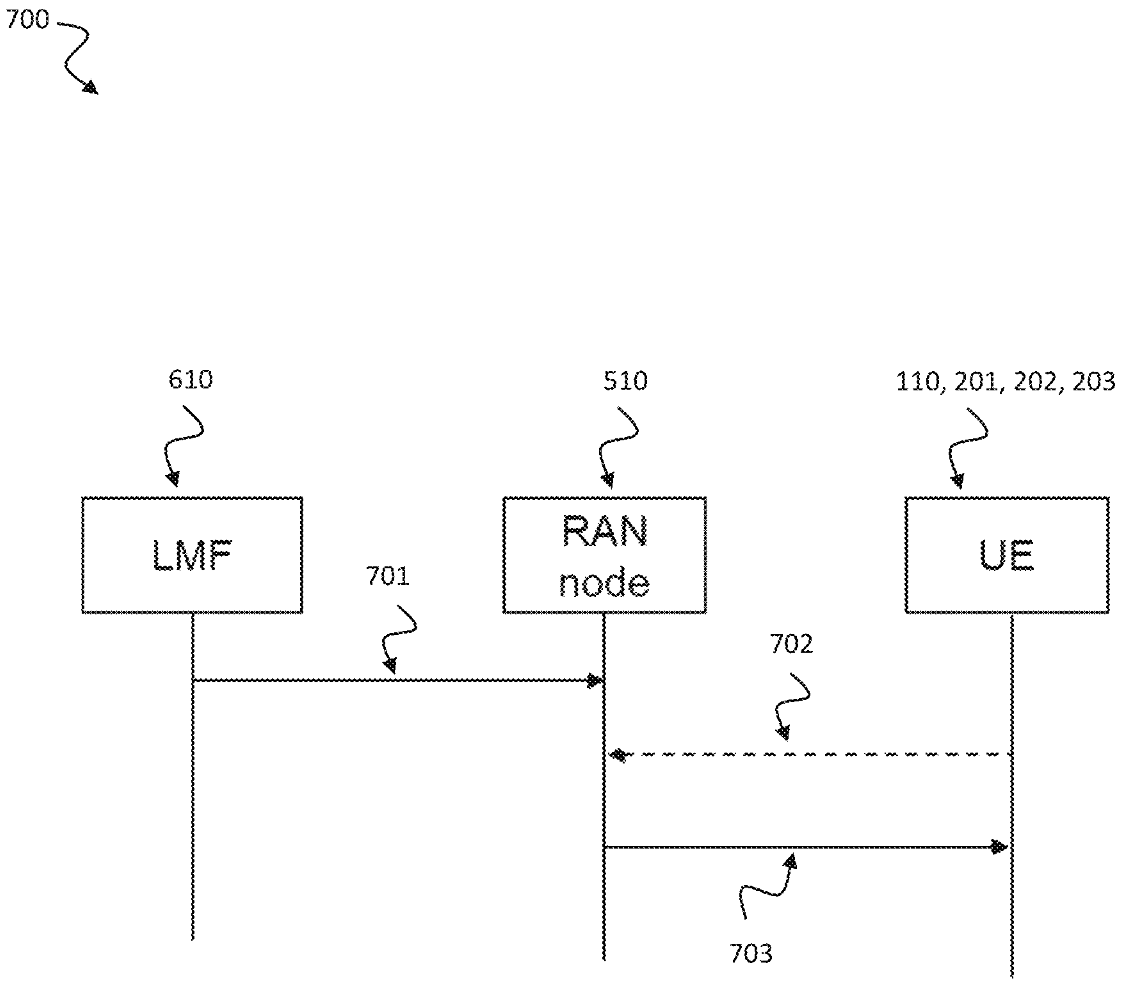
FIG. 7 shows a message sequence chart 700 illustrating non-UE-specific location reference indication configuration using NRPPa and SIB according to an example.

The indication configuration may be either UE-specific (see FIGS. 4 and 6) or non-UE-specific (see FIGS. 5 and 7). In case of UE-specific configuration, the location server may inform the location reference UE and/or the target UE about the configuration parameters of a location reference indication message respectively, as shown in FIG. 4. In case of non-UE-specific configuration, the configuration parameters may be transferred to the Radio Access Network (RAN) and then further broadcasted at one or multiple radio nodes, as shown in FIG. 5.

FIG. 4 shows a message sequence chart 400 illustrating UE-specific location reference indication configuration according to an example.

A location server 410, e.g. an network device that can be located in the radio access network or in the core network, may transmit a message for example "LocRefIndication message configuration" 411 to a location reference UE "LocRef UE" 201 to configure the UE 201 to transmit a location reference indication message, i.e. a user device that can serve as a location reference. The UE 201 can be the same device as the location reference UE 201 described above with respect to FIG. 2.

As described above, a location reference is a reference for a location in a coordinate system. The location reference can be defined by a geographic coordinate system, i.e. either a global coordinate system or a local coordinate system associated with positions relative to a device. The location reference can define an absolute geographic position that can be used by other devices, e.g. UEs 202 and 203 in FIG. 2, to determine their geographic position based on this location reference.

The location server 410 may transmit a message for example "LocRefIndication message configuration" 412 to the target UE 110 to inform the target UE 110 about the configuration of the location reference indication message. This message 412 can be the same as the message 411 or it can be slightly different, e.g. having different configuration parameters and different addresses.

FIG. 5 shows a message sequence chart 500 illustrating non-UE-specific location reference indication configuration according to an example.

A location server 410, e.g. an network device that can be located in the radio access network or in the core network, may transmit a message for example "Sidelink LocRef Information" 501 to a RAN node 510, e.g. a base station or a base station controller or an AMF entity or any other RAN entity, to inform the RAN node 510 about a configuration of the location reference indication message. The RAN node 510 then may transmit a message for example "LocRefIndication message configuration" 502, e.g. by broadcast, to the respective UE(s) 110, 201, 202, 203 to configure the UE(s) 110, 201, 202, 203 to receive or transmit a location reference indication message based on the role of the UEs. The message 502 may be same or similar to the messages 411 and/or 412 depicted in FIG. 4.

For a 5G system, existing protocols can be reused to implement the procedures shown in FIG. 4 and FIG. 5.

FIG. 6 shows a message sequence chart 600 illustrating UE-specific location reference indication configuration using LTE Positioning Protocol (LPP) according to an example.

A location management function (LMF) 610, e.g. a location management server or entity according to the terminology of the 5G system, e.g. an network device that can be located in the radio access network or in the core network, may transmit a message for example "LPP: ProvideAssistanceData (e.g. SL-LocRef-ConfigInfo)" 611 to a location reference UE "LocRef UE" 201 to configure the UE 201 to transmit a location reference indication message, i.e. a user device that can serve as a location reference. The UE 201 can be the same device as the location reference UE 201 described above with respect to FIG. 2.

The LMF entity 610 may transmit a message for example "LPP: ProvideAssistanceData (e.g. SL-LocRef-Common)" 612 to the target UE 110 to inform the target UE 110 about the configuration of the location reference indication message. This message 612 can be the same as the message 611 but can provide different configuration parameters (e.g. SL-LocRef-Common).

For UE-specific configuration, as shown in FIG. 6, LTE Positioning Protocol (LPP) messages for assistance data provision can be used. New common positioning Information Elements (IEs) for location reference indication configuration are introduced according to Table 1.

TABLE 1 new common positioning IEs for location reference indication configuration

| Parameter | explanation |
|---|---|
| SL-LocRef-ConfigInfo | Scheduling information and signal configuration of the location reference indication message for a location reference UE. Timing configuration e.g., start/end time, duration, periodicity of the indication message transmission. Types of events which trigger the location reference indication transmission. Location reference UE identity. |
| SL-LocRef-Common | Common information sent to target UEs includes the configuration information of the location reference indication message. |

The signaling procedure using these IEs is shown in FIG. 6 which is an embodiment of the signaling procedure in FIG. 4 using LPP messages.

FIG. 7 shows a message sequence chart 700 illustrating non-UE-specific location reference indication configuration using NRPPa and SIB according to an example.

A location management function (LMF) 610, e.g. a location management server or entity according to the terminology of the 5G system, e.g. an network device that can be located in the radio access network or in the core network, may transmit a message for example "NRPPa: Sidelink LocRefInformation" 701 to a RAN node 510, e.g. a base station or a base station controller or an AMF entity or any other RAN entity, to inform the RAN node 510 about a configuration of a location reference indication message. After receiving a message for example "RRCSystemInfoRequest" 702 from the UE 110, 201, 202, 203 by which the UE asks the RAN node 510 for system information, the RAN node 510 may transmit a message for example "SIBtype X (e.g., SL-LocRef-Common)" 703, e.g., by broadcast, to the respective UE(s) 110, 201, 202, 203 to configure the UE(s) 110, 201, 202, 203 to receive or transmit a location reference indication message.

For non-UE-specific configuration, a new NR Positioning Protocol a (NRPPa) procedure is introduced in order to transfer location reference related information from LMF 610 to the RAN 510. New types of System Information Block (SIB) containing location reference indication configuration (SL-LocRef-Common) can be obtained by location reference UEs and target UEs upon request, as shown in FIG. 7.

Both UE-specific and non-UE-specific indication configuration can also be carried out as a pre-configuration procedure. This implies that only the location reference indication configuration may be acquired while a UE-type device is within the radio network coverage. The indication message transmission is over sidelink and can be applied to partial coverage and out-of-coverage scenarios.

2. Indication Message Transmission

FIG. 8 shows a message sequence chart 800 illustrating location reference indication message transmission between a location reference UE 201 and a target UE 110 according to an example.

The indication of a location reference UE 201 may be carried out over a direct radio link between the location reference UE 201 and the target UE 110 as illustrated in FIG. 8. This ensures that positioning measurements later can be obtained using the sidelink signal transmitted between the two.

After a location reference UE 201 is enabled, it may send a location reference indication message 811 or simply called an "indication message" 811 to its vicinity, e.g. as shown in Option 1 (801) of FIG. 8. The content of this message 811 may consist of at least one of the following parameters in Table 2. This message 811 can be carried in PSBCH, PSSCH, PSCCH, MAC-CE or over PC5-RRC interface for sidelink communication.

In case that a direct communication link between the location reference UE 201 and the target UE 110 has not been established, the location reference UE 201 may be configured or pre-configured to broadcast location reference indication message 811 over sidelink. The target UEs 110 may be configured or pre-configured to listen correspondingly. RAN may pre-configure dedicated resource region for location reference indication message 811.

In case that a direct communication link between the location reference UE 201 and the target 110 has been established, the location reference indication message 811 can be delivered via unicast. The location reference indication message 811 can also be groupcasted to a group of UEs which is interested in obtaining sidelink positioning measurements.

TABLE 2 content of location reference indication message

| Parameter | explanation |
|---|---|
| Location reference UE ID | Identity assigned by the location server |
| Availability of absolute location information | If true, the location reference UE is able to assist absolute positioning of a target UE |
| PRS capability | Indicates location reference UE's capability to transmit positioning reference signals over sidelink. Parameters may include number of antennas/panels/antenna reference points (ARPs), position of the antennas/panels/ARPs, maximum bandwidth, supported frequency bands, maximum transmit power per panel/beam/device etc. Based on these a target UE determines who transmits PRS. |
| Positioning measurement capability | Indicates location reference UE's capability to carry out positioning measurement on sidelink. Parameters may include types of measurements (e.g., reference signal time difference (RSTD), reference signal receive power (RSRP), etc.), number of antennas/panels/ARPs, position of the antennas/panels/ARPs, maximum bandwidth, supported frequency bands, etc. Based on these a target UE determines who carries out positioning measurements. |
| Location information | Based on which a target UE determines whether a location reference UE is able to assist the positioning. Parameters may include whether the location information is known or estimated with uncertainty, source of the location information (e.g., GNSS), time stamp, valid time duration of the location information etc. |
| Valid time duration | Indicate the time duration for which the information provided in the indication message is valid. After the timer expired, a location reference information may be updated. |

In some embodiments as depicted in FIG. 8, the location reference indication message 811 can be delivered in multiple stages.

For instance, a first stage 821 indication message for example “Location reference indication message” 811 may consist of only a short version indicating basic information of a location reference 201, such as identity, availability of absolute position, indicators such as capability flag or levels and etc. A second stage indication message for example “Location reference indication message” 822 consisting of the detailed information can be obtained by the target UEs 110 which intend to obtain further positioning assistance from this location reference UE 201. An example of the first stage location reference indication message is provided in Table 2A below:

TABLE 2A content of a first stage location reference indication message

| field | Location reference UE ID | Availability of absolute location | PRS capability level | Measurement capability level | location information accuracy level |
|---|---|---|---|---|---|
| # bits | X | 1 (boolean) | 1 (whether sidelink PRS transmission is supported) or x, e.g., 2 (4 levels allowed) | 1 (whether sidelink PRS measurement is supported) or x, e.g., 2 (4 levels allowed) | X e.g., 2 (4 accuracy levels) |

Upon receiving the first stage indication message 821, a target UE 110 may determine based on the capability levels how to proceed, namely to request further sidelink PRS transmission from the UE X or to configure the UE X to measure a PRS transmitted by the target, to abandon the UE X due to its insufficient accuracy of the location information, or to request detailed location reference information and etc.

In the following, two examples are provided for two-stage location reference indication message transmission.

Example 1: The location reference UE 201 may be configured to transmit an indication sequence which embeds its location reference UE ID. The target UEs 110 may be configured to detect the sequence in the received signal and decode the location reference UE ID correspondingly. This indication sequence may be accompanied by a short payload containing the first stage indication message 821. Alternatively, the sidelink synchronization signal in 5G NR may be adopted for this purpose. Then the first stage location reference indication message 821 may be included in the following PSBCH. Based on the first stage location reference indication message 821 received, the target UE 110 determines whether to further request or decode the full indication message, namely details of the information listed in Table 2.

Example 2: A Sidelink Control Information format may be defined for sidelink positioning measurements purpose, with its first stage 821 carried on PSCCH and the second stage 822 on PSSCH. The first stage 821 may contain the short version of the location reference indication message as well as the scheduling of the extended location reference indication message 822. A target UE 110 may determine whether to decode the extended message 822 based on the short version 821 received on PSCCH.

3. Update

After a location reference UE is enabled, its status is updated, especially the location information, on a timely basis. The location information may include information on whether an absolute position is available, whether the position is perfectly known or estimated with uncertainty, a source of the location information (e.g. GNSS), etc. Table 3 provides a list of parameters that can be included in the location reference UE’s location information IE (SL-LocRef-LocationInfo).

TABLE 3 location reference location information (SL-LocRef-LocationInfo)

| Parameter | Explanation |
|---|---|
| Location estimate | Location coordinates of the location reference UE, including uncertainty information defined as one of the geographic shapes in [23032] |
| Velocity estimate | Velocity estimate of the location reference UE, including speed, bearing information and uncertainty. Definition of velocity shapes in [23032] may be used. |
| Location source | Source positioning technology, e.g., GNSS, WLAN, radio etc. |
| Location time stamp | Time when the location estimate is valid |
| Location reference UE | Boolean, indicating whether the UE is a location reference |
| Valid time duration | Valid time of the location information |

The update procedure ensures that the location reference UEs are qualified given the changing radio environment due to moving scatterer or location reference UE’s mobility. The status update can be carried out either at the location server, as exemplarily shown in FIGS. 9 and 10 or at the location reference UE itself, as exemplarily shown in FIG. 11.

FIG. 9 shows a message sequence chart 900 illustrating location reference UE status update at the location server according to an embodiment.

In case that a location server 410 updates location reference UEs’ 201 status, the location server 410 may request location information 901 of the location reference UE 201 on a timely basis to check whether a location reference UE 201 is qualified or may be needed. The requested location information 901 may consist of a subset of the parameters listed in Table 3. An indication field may be introduced to the location reference configuration information listed in Table 1 and is used to enable/disable the location reference UE 201. The signaling procedure for location server based location reference update is shown in FIG. 9 and described in the following:

The location server 410 transmits a message, for example, “Request Location Information” 901 to location reference UE 201 to request for location information. The location reference UE 201 provides the requested location information by message 902 to the location server 410. Then, an update 910 can be performed by the location server 410. After the update 910, location server 410 may transmit a message, for example, “Provide LocRef Configuration Information” 903 to location reference UE 201 to provide updated location reference configuration information to location reference UE 201. The location reference UE 201 answers with Confirm or Error message 904 in case of confirmation or Error.

FIG. 10 shows a message sequence chart 1000 illustrating location reference UE status update at the LMF using LPP according to an example.

For a 5G system, LPP messages can be adopted to update a location reference UE’s 201 location information (SL-LocRef-LocationInfo) and to provide updated configuration information to a location reference UE 201 as assistance data (SL-LocRef-ConfigInfo). The LPP-based signaling procedure is provided in FIG. 10. Such a procedure can, for example, be applied when a location reference UE 201 is in the network coverage.

The signaling procedure for location server based location reference update using LPP messages is shown in FIG. 10 and described in the following:

The LMF entity 610 may transmit a message for example "LPP: RequestLocationInformation (SL-LocRef-Location-Info)" 1001 to location reference UE 201 to request for location information. The location reference UE 201 may provide the requested location information by message for example "LPP: ProvideLocationInformation (SL-LocRef-LocationInfo)" 1002 to the LMF entity 610. Then, an update 1010 can be performed by the LMF entity 610. After the update 1010, LMF entity 1010 may transmit a message for example "LPP: ProvideAssistanceData (SL-LocRef-Config-Info)" 1003 to location reference UE 201 to provide updated location reference configuration information to location reference UE 201. The location reference UE 201 answers with message "LPP: Confirm/Error" in case of confirmation or Error.

FIG. 11 shows a message sequence chart 1100 illustrating location reference UE status update at a location reference UE according to an example.

A location reference UE 201 may also be configured to carry out status update and validate itself on a timely basis. The location server or LMF entity 610 may configure the parameters for a location reference UE 201 to carry out location reference update according to Table 4. This information can be provided to the location reference UE 201 together with the location reference configuration information (SL-LocRef-ConfigInfo) in Table 1. As long as the update configuration has been conveyed to the location reference UE 201, the update can be carried out at the UE side for both in-coverage and out-of-coverage scenarios. If a location reference UE 201 is in coverage, it has the option to inform the location server 610 about its location reference service status.

TABLE 4 location reference update configuration parameters

| parameter | explanation |
|---|---|
| UEbased update | Boolean, whether a location reference UE carries out status update after its valid time duration |
| Update timing information | When or how often a location reference UE carries out status update, e.g., starting time, periodicity |
| Update parameters | Parameters to be updated, e.g., location information in Table 3 |

For a 5G system, the procedures described above can be implemented using LPP messages with newly introduced new IEs. An example is shown in FIG. 11.

The signaling procedure for location reference UE status update at the UE using LPP messages is shown in FIG. 11 and described in the following:

The LMF entity 610 may transmit a message for example "LPP: ProvideAssistanceData (SL-LocRef-ConfigInfo, UpdateConfig)" 1101 to location reference UE 201 to configure a location reference update. Then, an update 1110 of location information may be performed by the location reference UE 201. After the update 1110, the location reference UE 201 may provide the updated location information by message for example"LPP: ProvideLocationInformation (SL-LocRef-Location Info)" 1102 to the LMF entity 610.

Figure 12:
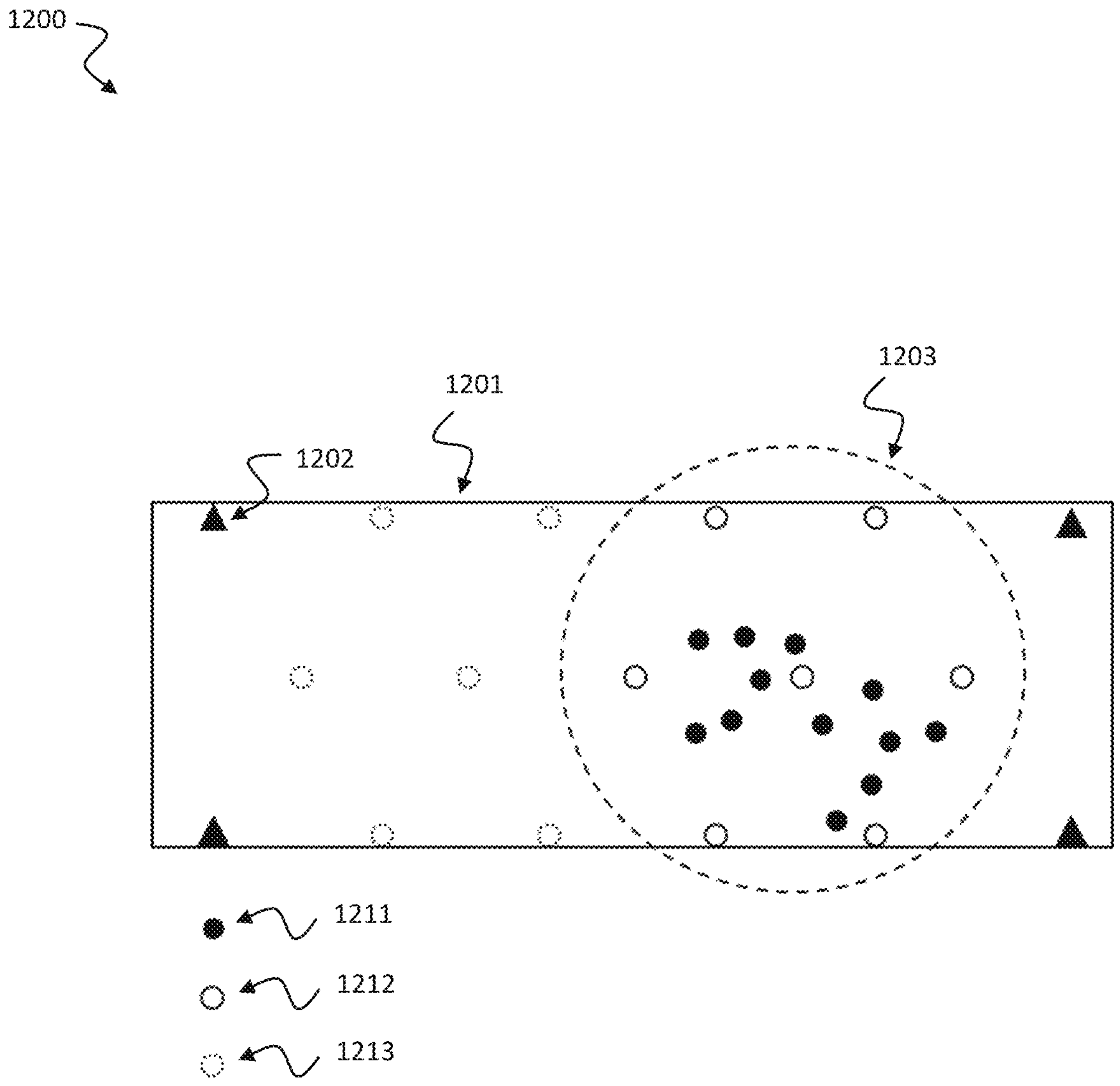
FIG. 12 shows a schematic diagram illustrating dynamically enabled location reference UEs in a factory floor 1200 according to an example.

FIG. 12 shows a schematic diagram illustrating dynamically enabled location reference UEs in a factory floor 1200 according to an example.

Given the 3-operation method shown above with respect to FIG. 3, location reference UE indication can be dynamically enabled or disabled in order to provide enhanced location service in various environment. In the following, two examples for UE-based location reference service applied in different scenarios are presented, namely in-coverage and out-of-coverage.

FIG. 12 shows an entire factory floor 1201 provided with location service with certain accuracy requirement.

Four RAN nodes 1202 have been deployed for the purpose of mobile radio communication. However, such a deployment may be not sufficient to meet the LCS quality of service in the given region. In order to provide enhanced LCS with variable accuracy requirements, UE-type anchor tags 1212, 1213 with location known are installed. In this example, it can be assumed that both the target UEs 1211 and the UE-type anchor tags 1212, 1213 are in the radio coverage, namely communication links between a location server and the UEs are available. Thus, the location server may dynamically determine how many and which anchor tags to enable as location reference UEs according to the positioning accuracy requirement and the a-priori position or velocity estimation of the target UEs.

In FIG. 12, the moving target UEs are denoted by reference sign 1211, the enabled location reference UEs are denoted by reference sign 1212 and the disabled location reference UEs are denoted by reference sign 1213.

Figure 13:
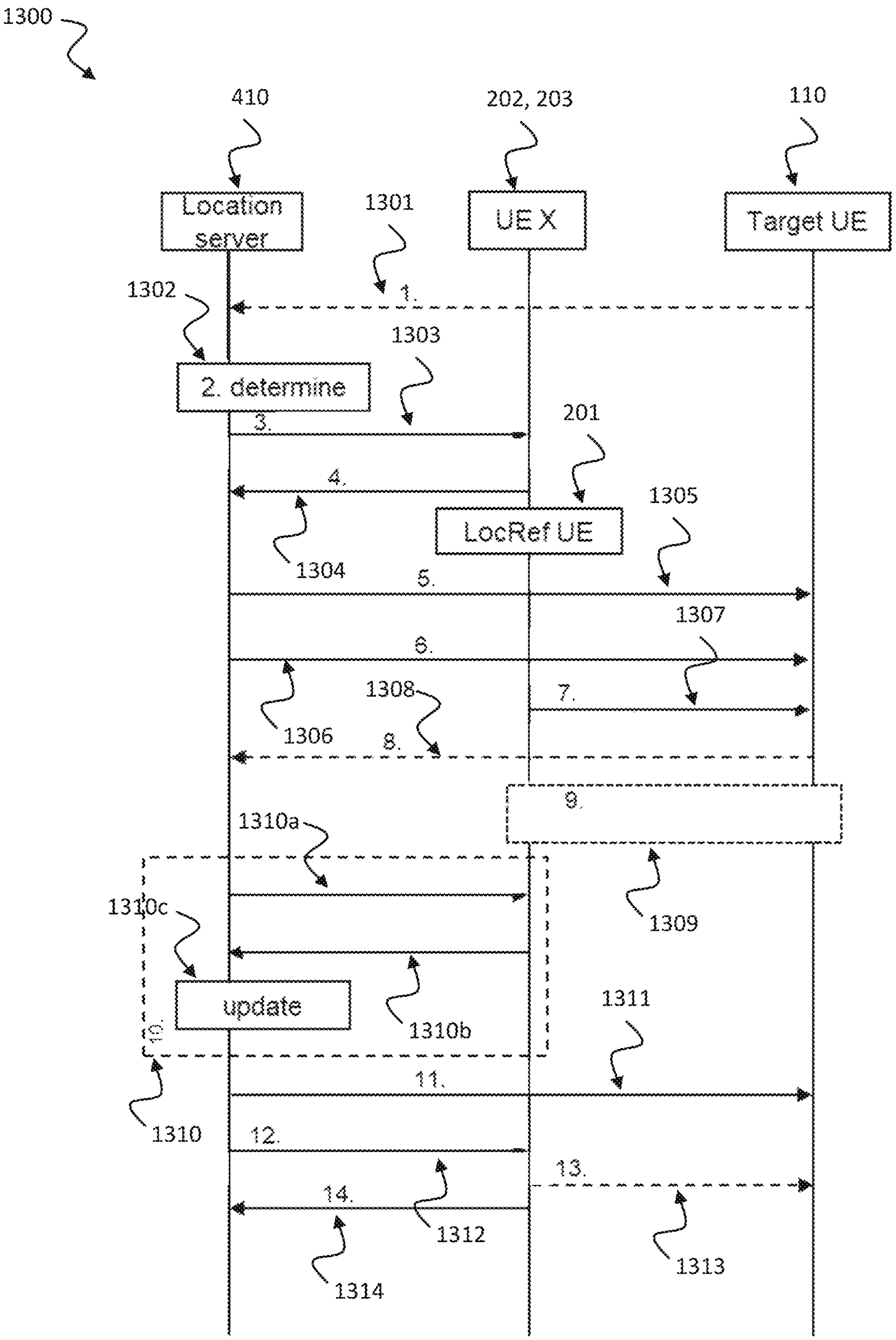
FIG. 13 shows a message sequence chart of a signaling procedure 1300 for dynamically enabling location reference UE upon target UE's request according to an embodiment.

A detailed signaling procedure is shown in FIG. 13 and described below.

FIG. 13 shows a message sequence chart of a signaling procedure 1300 for dynamically enabling location reference UE upon target UE's request according to an embodiment. A location server 410, e.g. as described in the sections above, a UE X, e.g. a UE 201, 202, 203 according to FIG. 2 as described in the above sections, and a target UE 110, e.g. a target UE 110 according to FIG. 2 as described in the above sections are communicating with each other as described in the following.

Operation 1. Message "RequestAssistanceData", 1301:

In case of UE-based positioning, a target UE may inquire the location server about additional UE-type location references. For network-based positioning, the location server determines whether additional UE-type location references are desired.

Operation 2. Determine, 1302:

The location server may determine whether the UE X serves as a location reference.

Operation 3. Message "ProvideAssistanceData (SL-LocRef-ConfigInfo (enable))", 1303:

The location server may provide the location reference configuration information to the UE X and enable location reference indication message transmission. The location reference configuration information may contain configuration of the location reference indication message.

Operation 4. Message "Confirm", 1304:

UE X confirms.

Operation 5. Message "ProvideAssistanceData", 1305:

The location server may provide the location reference UE X's identity to the target UE as positioning assistance data.

Operation 6. Message "ProvideAssistanceData (SL-LocRef-Common)", 1306:

The location server may provide the target UE the common configuration of location reference indication message.

Operation 7. Message "Location reference indication message", 1307:

The location reference UE X may send location reference indication message over sidelink. The target UE may listen and learn that sidelink positioning measurement can be obtained using the PRS transmitted between UE X and itself.

Operation 8. Message "ProvideLocationInformation (SL-LocRef-UElist)", 1308:

In some embodiments, the target UE may inform the location server about the selected location reference UEs in case of network-based positioning.

Operation 9. Sidelink positioning measurement procedure, 1309:

Sidelink positioning measurements may be obtained using the signal transmitted between the UE X and the target UE.

Operation 10. Periodic update 1310 with messages "RequestLocationInformation", 1310*a*, "ProvideLocationInformation", 1310*b* and update 1310*c:*

In this example, the location server may carry out the location reference update by requesting location information from the location reference UE X periodically then evaluating whether the UE X is required to stay enabled. In the given example with fixed UE-type device whose location is perfectly known, location information update may become optional as well.

Operation 11. Message "ProvideAssistanceData", 1311:

Assuming location reference UE X may be not required any more after the update, the location server may inform the target UE that the location reference UE X is disabled.

Operation 12. Message "ProvideAssistanceData (SL-LocRef-ConfigInfo (disable)", 1312:

The location server may send the location reference configuration information to disable UE X as a location reference.

Operation 13. Message "Location reference indication message", 1313:

UE X may inform the target UE directly over sidelink that location reference service is disabled at this UE. Alternatively, in case that no further indication message is received after the valid time duration reached, the target UE may assume that the location reference UE is disabled. This applies to the partial or out-of-coverage scenario where communication links between the location server and the UEs are not available.

Operation 14. Message "Confirm", 1314:

UE X may confirm to the location server that its location reference service is disabled.

As depicted in FIG. 12, this procedure can be applied to multiple location reference UEs and to multiple target UEs in parallel. The location server may take coarse estimated location of multiple target UEs into account and determine to enable multiple location reference UEs within a region of common interest.

In this example, the UE-based location reference service may allow existing network-based positioning methods to include sidelink positioning measurements. For target UE based positioning, the location server may provide configuration information of the location references. By dynamically enabling or disabling the location reference UEs, the positioning system is capable of providing LCS with scalable accuracy requirements and optimized power consumption.

Besides industrial applications, such as factory floor, this signaling procedure 1300 can also be applied to scenarios where UE-type infrastructure nodes can be involved in positioning in order to achieve higher positioning accuracy. Examples include roadside units, unmanned aerial vehicles etc.

Figure 14:
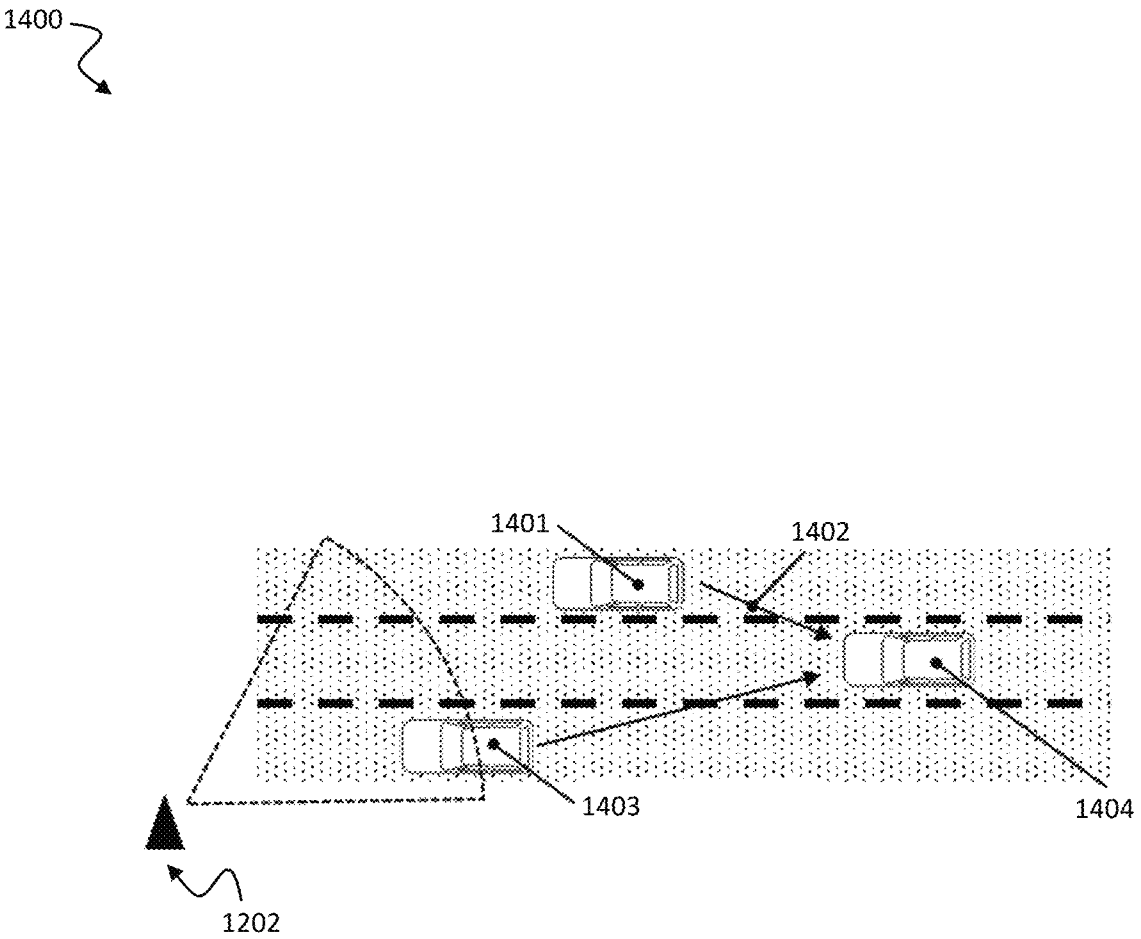
FIG. 14 shows a schematic diagram illustrating a street scenario 1400 with location reference UEs providing location reference service to an out-of-coverage target UE according to an example.

FIG. 14 shows a schematic diagram illustrating a street scenario 1400 with location reference UEs providing location reference service to an out-of-coverage target UE according to an example. RAN node 1202 can reach only some of the UEs 1403 as shown in FIG. 14. In this example, a car is a user device or UE. UE 1403 is an in-coverage UE, while UEs 1401 and 1404 are out-of-coverage UEs. Nevertheless, out-of-coverage UE 1401, e.g. an autonomous car with higher location accuracy, can be a location reference UE transmitting location reference indication message 1402 to out-of-coverage UE 1404.

In the scenario of LCS region of interest with partial/out-of-coverage, accurate positioning in partial and out-of-coverage scenarios are particularly interesting for V2X and public safety use cases. In sheltered outdoor and deep indoor area, such as a long tunnel or an underground parking lot, GNSS or base stations may not be reachable for the UEs. Mission critical organizations require mission critical services to have accurate positioning in order to locate a first responder in all challenging scenarios.

Since location reference indication configuration and update configuration can be pre-defined by the location server and provided to the UE, the location reference UE may enable the indication message transmission on its own. Triggered by a location request, a target UE may be pre-configured to search for location reference UEs in its vicinity and obtain positioning measurements using the signal transmitted over sidelink.

An application example is depicted in FIG. 14, where in-coverage UE 1403 is (pre-) configured to provide location reference service, as well as some of the out-of-coverage UEs 1401 with enhanced positioning capability, e.g. autonomous car. With the help of these UE-type location references, LCS can be provided to out-of-coverage scenarios or those with insufficient numbers of reference base stations. The signaling procedure is presented in FIG. 15. It can be seen that only UE-based behavior is required.

Figure 15:
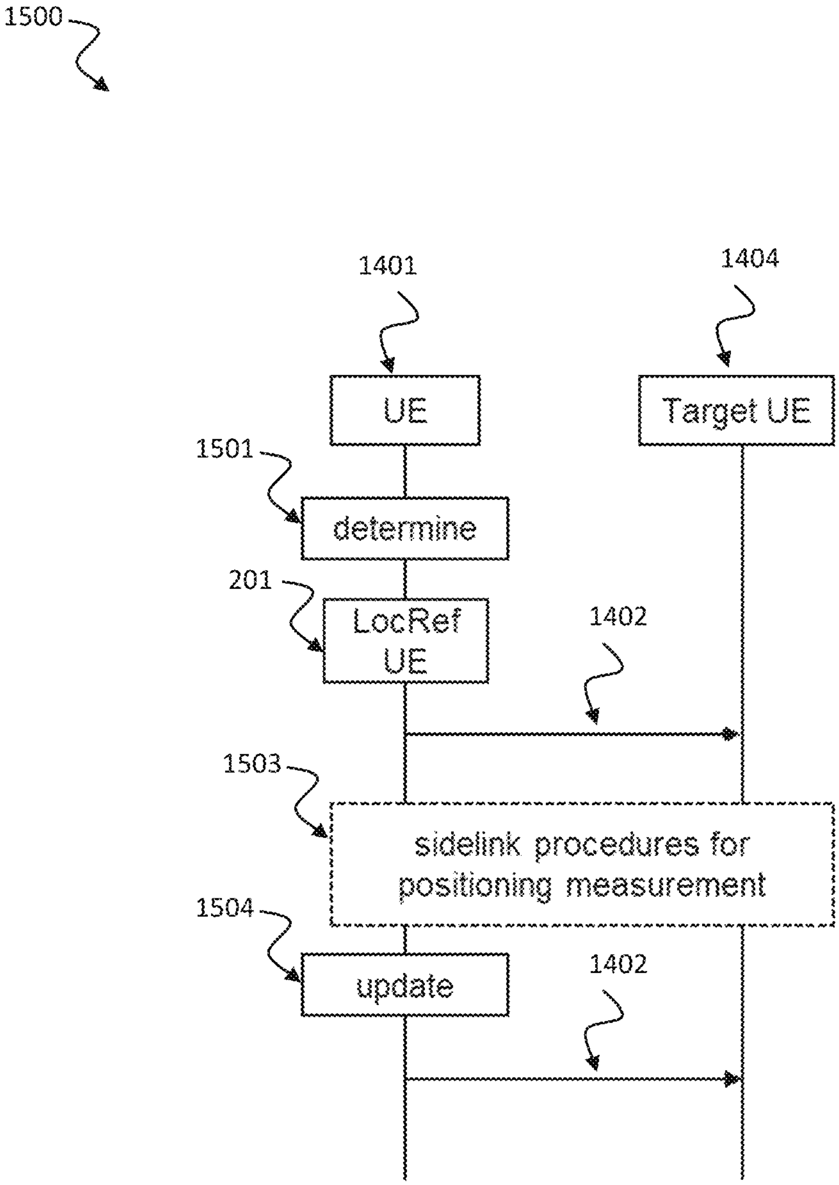
FIG. 15 shows a message sequence chart illustrating a signaling procedure 1500 for UE-based location reference service according to an example.

FIG. 15 shows a message sequence chart illustrating a signaling procedure 1500 for UE-based location reference service according to an example.

UE 1401, e.g. UE 1401 in autonomous car shown in FIG. 14, can determine 1501 to be a location reference UE 201 and transmit location reference indication message 1402 according to message 1402 in FIG. 14 to target UE 1404, e.g. out-of-coverage UE 1404 in FIG. 14. Then both UEs 1401, 1404 exchange sidelink procedures for positioning measurement 1503. UE 1401 then performs update 1504 and transmits updated location reference indication message 1402 to target UE 1404.

Figure 16:
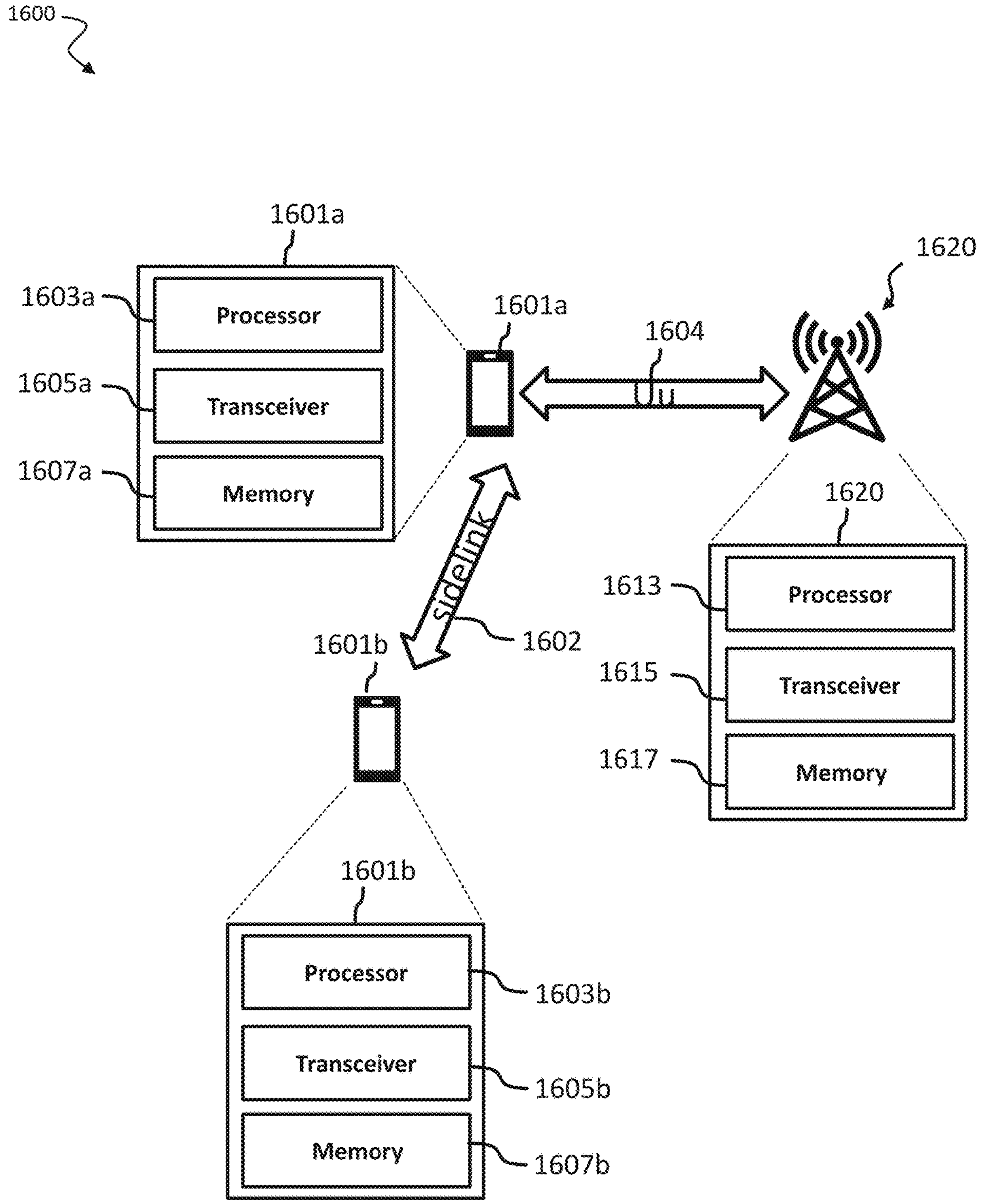
FIG. 16 shows a schematic diagram illustrating a communication system 1600 according to the disclosure.

FIG. 16 shows a schematic diagram illustrating a communication system 1600 according to the disclosure.

The communication system 1600, may include a first user device 1601*a* or UE, respectively, according to an example, one or more second user devices or UEs 1601*b* and a network device or base station 1620. In the example shown in FIG. 16, the first user device 1601*a* and the second user device 1601*b* are, by way of example, portable devices, in particular smartphones 1601*a,b*. However one or more of these user devices 1601*a,b* may also be, by way of example, laptop computer 1601*a,b*, mobile vehicle or machine-type device. The first user device 1601*a*, and the one or more second user devices 1601*b* may be configured to communicate with the base station 1620, for instance, via Uu channel. The first user device 1601*a*, and the one or more second user devices 1101*b* are configured to communicate with each other by sidelink channel without the base station 1120.

As can be seen from FIG. 16, the first user device 1601*a* may comprise a processing circuitry 1603*a* for instance, a processor 1603*a*, for processing and generating data, a transceiver 1605*a*, including, for instance, an transmitter, a receiver and an antenna, for exchanging data with the other components of the communication system 1600, and a non-transitory memory 1607*a* for storing data. The processor 1603*a* of the first user device 1601*a* may be implemented in hardware and/or software.

The hardware may comprise digital circuitry, or both analog and digital circuitry. Digital circuitry may comprise components such as application-specific integrated circuits (ASICs), field-programmable arrays (FPGAs), digital signal processors (DSPs), or general-purpose processors. The non-transitory memory 1607*a* may store data as well as executable program code which, when executed by the processor 1603*a*, causes the first user device 1601*a* to perform the functions, operations and methods described in this disclosure.

In an example, the one or more second user devices 1601*b* may have a similar architecture as the first user device 1601*a*, i.e. may comprise a processor 1603*b* for processing and generating data, a transceiver 1605*b* for exchanging data with the other components of the communication system 1600 as well as a memory 1607*b* for storing data. Likewise, as illustrated in FIG. 16, the base station 1620 may comprise a processor 1613 for processing and generating data, a transceiver 1615 for exchanging data with the other components of the communication system 1600 as well as a non-transitory memory 1617 for storing data.

As described above, the first user device 1601*a* may comprise a processor 1603*a* and a transceiver 1605*a*. The transceiver 1605*a* of the first user device 1601*a* may be configured to receive a location reference indication configuration, wherein the location reference indication configuration may be used to configure the first user device 1601*a* to transmit or receive an indication message. The transceiver 1605*a* of the first user device 1601*a* may be configured to transmit or receive an indication message over a sidelink 1602, wherein the indication message is used to indicate a location reference is available on the sidelink 1602 for positioning assistance.

The indication message may be transmitted or received as described above with respect to the section “2. indication message transmission”. The location reference indication configuration may correspond to the location reference indication configuration as described above with respect to the section “1. Configuration”.

The first user device 1601*a* may be configured to be a location reference device 201, e.g. as described above with respect to FIGS. 2 to 15, and provide the indication message, e.g. the indication message 811 as described above with respect to FIG. 8, over the sidelink 1602 for a second user device 1601*b*, e.g. a second reference device 110 as described above with respect to FIGS. 2 to 15. The first user device 1601*a* may be configured to provide a measurement reference of positioning for the second user device 1601*b*, 110.

The transceiver may receive the location reference indication configuration via a dedicated signaling, a broadcast signaling, or a groupcast signaling, e.g. as described above with respect to FIGS. 4 to 11. The dedicated signaling may be referred as UE-specific signaling, and broadcast signaling or groupcast signaling may be referred as non UE-specific signaling.

The first user device 1601*a* may be configured to provide the measurement reference of positioning for the second user device 1601*b*, 110 by: transmitting a positioning reference signal, PRS, over sidelink 1602 to provide the measurement reference of positioning for the second user device 1601*b*, 110; or measuring a reference signal, RS, transmitted by the second user device 1601*b*, 110 for usage as the measurement reference of positioning.

The indication message, e.g. indication message 811 as described above with respect to FIGS. 2 to 15, in particular FIG. 8, may comprise at least one of the following: a location reference identity of the first user device 1601*a*, an indication on whether the first user device 1601*a* is capable to assist absolute positioning of a second user device 1601*b*, an indication on whether the first user device 1601*a* is capable to transmit positioning reference signals, PRSs, over sidelink 1602; an indication on whether the first user device 1601*a* is capable to carry out positioning measurement on sidelink; location information indicating the second user device 1601*b* whether the first user device 1601*a* is able to assist the second user device in positioning; an indication of a time duration for which the information provided in the indication message 811 is valid, a PRS capability level indicative of a supported level of the PRS sidelink 1602 transmission, a measurement capability level indicative of a level of the positioning measurement on sidelink 1602, a location information accuracy level indicative of an accuracy level of the location information from the first user device 1601*a*. This information corresponds to the parameters of Table 2 and additionally the parameters for the basic information according to the Table 2A as described above.

The indication whether the first user device is capable to transmit positioning reference signals over sidelink 1602 comprises at least one of: number of antennas, panels and/or antenna reference points, ARPs; position of the antennas, panels and/or ARPs; maximum bandwidth; supported frequency bands; maximum transmit power per antenna, panel and/or ARP. This information corresponds to “PRS capability” section of Table 2 as described above.

The indication whether the first user device 1601*a* is capable to carry out positioning measurement on sidelink comprises at least one of: types of measurements, e.g. reference signal time difference, RSTD, reference signal receive power, RSRP, number of antennas, panels and/or antenna reference points, ARPs; position of the antennas, panels and/or ARPs; maximum bandwidth, supported frequency bands. This information corresponds to “Positioning measurement capability” section of Table 2 described above.

The location information may comprise at least one of: Location coordinates of the first user device 1601*a* including uncertainty information of location estimation, Velocity estimate of the first user device 1601*a*, including speed, bearing information and uncertainty information of the velocity estimate, Location source positioning technology, in particular GNSS, WLAN, radio, Location time stamp indicating time when the location estimate is valid, an indication whether the first user device 1601*a* is a location reference, valid time duration of the location information. This information corresponds to the “Location information” section of Table 2 as described above and more particularly to the parameters in Table 3 describing the location information in detail (for the update case), see above.

The indication message 811 may be transmitted via unicast to the second user device 1601*b* or via groupcast to a group of user devices, or via broadcast to a group of user devices.

The indication message 811 may be carried in one of: Physical Sidelink Broadcast Channel, PSBCH, Physical Sidelink Shared Channel, PSSCH, Physical Sidelink Control Channel, PSCCH, Medium Access Control-Control Element, MAC-CE, and a PC5-RRC interface for sidelink communication.

The indication message 811 may comprise at least a first part 821 and a second part 822, e.g. as described above with respect to FIG. 8, wherein the first part 821 of the indication message and the second part 822 of the indication message are transmitted in separate messages.

The first part 821 of the indication message may comprises at least one of: the location reference identity of the first UE, the indication on whether the first user device 1601*a* is capable to assist absolute positioning of a second user device, the PRS capability level indicative of a supported level of the PRS sidelink 1602 transmission, the measurement capability level indicative of a level of the positioning measurement on sidelink, the location information accuracy level indicative of an accuracy level of the location information from the first user device 1601*a*.

The transceiver 1605*a* may be configured to receive a location information request, wherein the location information request is used to update a status of the first user device 1601*a* to be used as location reference device for the second user device 1601*b*.

The location information request may comprise at least one of: location coordinates of the first user device 1601*a* including uncertainty information of location estimation, a velocity estimate of the first user device 1601*a*, including speed, bearing information and uncertainty information of the velocity estimate, information on a location source positioning technology, e.g. GNSS, WLAN, radio, location time stamp indicative of a time when the location estimate is valid, an indication on whether the first user device 1601*a* is a location reference, e.g. a location reference 201 as described above with respect to FIGS. 2 to 14, a valid time duration of the location information. This information corresponds to "Location information" section of Table 2 as described above.

The transceiver 1605*a* may be configured to send a location information update to a network device 1620, wherein the location information is used to update a status of the first user device 1601*a* to be used as location reference device 201 for the second user device 1601*b*, e.g. as described above with respect to the section "3. Update".

The processor 1603*a* may be configured to trigger the status updating of the first user device 1601*a* based on at least one of: a location reference update carried out at a location server 410, 610; or a location reference update carried out at the first user device 1601*a*, e.g. as described above with respect to FIGS. 4 to 14.

The location reference update may comprise at least one of: a parameter indicating whether the first user device carries out the update, update timing information indicating when or how often the first user device 1601*a* carries out the update, parameters to be updated, e.g. as described above with respect to the "Update" section.

The location information request and/or the location information update may be received from a Location Management Function, LMF 610, via LTE positioning protocol, LPP, or new radio positioning protocol annex, NRPPa, e.g. as described above with respect to FIG. 7.

The location reference indication configuration may be received via at least one of: LTE positioning protocol, LPP, new radio positioning protocol annex, NRPPa, or radio resource control, RRC, protocol e.g. as described above with respect to FIGS. 6, 10, 11.

As described above, the network device 1620 comprises a processor 1613 and a transceiver 1615. The processor 1613 is configured to obtain a location reference indication configuration, wherein the location reference indication configuration is used to configure a first user device 1601*a* to transmit or receive an indication message over a sidelink 1602 to or from a second user device 1601*b*, wherein the indication message indicates a location reference is available on the sidelink 1602 for positioning assistance. The transceiver 1615 is configured to transmit the location reference indication configuration to the first user device 1601*a*.

As described above, the indication message may comprise at least one of the following: a location reference identity of the first user device 1601*a*, an indication on whether the first user device 1601*a* is capable to assist absolute positioning of a second user device 1601*b*, an indication on whether the first user device 1601*a* is capable to transmit positioning reference signals, PRSs, over sidelink 1602; an indication on whether the first user device 1601*a* is capable to carry out positioning measurement on sidelink 1602; location information indicating the second user device 1601*b* whether the first user device 1601*a* is able to assist the second user device 1601*b* in positioning; an indication of a time duration for which the information provided in the indication message is valid, a PRS capability level indicative of a supported level of the PRS sidelink transmission, a measurement capability level indicative of a level of the positioning measurement on sidelink, a location information accuracy level indicative of an accuracy level of the location information from the first user device 1601*a*.

The transceiver 1615 may be configured to transmit the location reference indication configuration via a dedicated signaling, a broadcast signaling, or a groupcast signaling.

As described above, the location reference indication configuration may be received via at least one of: LTE positioning protocol, LPP, new radio positioning protocol annex, NRPPa, or RRC protocol.

Figure 17:
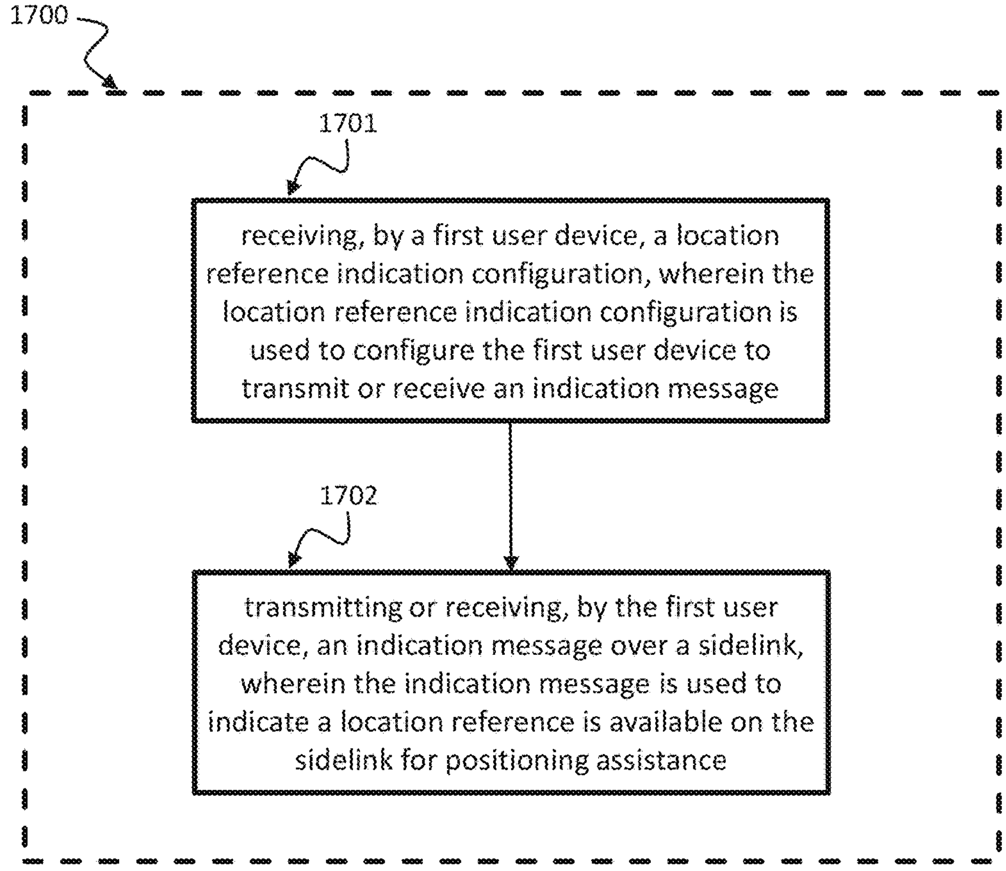
FIG. 17 shows a schematic diagram illustrating a method 1700 for indicating a location reference for positioning assistance according to the disclosure.

FIG. 17 shows a schematic diagram illustrating a method 1700 for indicating a location reference for positioning assistance according to the disclosure.

The method 1700 comprises: receiving 1701, by a first user device, a location reference indication configuration, wherein the location reference indication configuration is used to configure the first user device to transmit or receive an indication message, e.g. as described above for the first user device.

The method 1700 comprises: transmitting or receiving 1702, by the first user device, an indication message over a sidelink, wherein the indication message is used to indicate a location reference is available on the sidelink for positioning assistance, e.g. as described above for the first user device.

The present disclosure also supports a computer program product including computer executable code or computer executable instructions that, when executed, causes at least one computer to execute the performing and computing operations described herein, in particular the methods and procedures described above. Such a computer program product may include a readable non-transitory storage medium storing program code thereon for use by a computer. The program code may perform the processing and computing operations described herein, in particular the methods and procedures described above.

While a particular feature or embodiment of the disclosure may have been disclosed with respect to only one of several embodiments, such feature or embodiment may be combined with one or more other features or embodiments of the other embodiments as may be desired and advantageous for any given or particular application. Furthermore, to the extent that the terms "include", "have", "with", or other variants thereof are used in either the detailed description or the claims, such terms are intended to be inclusive in a manner similar to the term "comprise". Also, the terms "exemplary", "for example" and "e.g." are merely meant as an example, rather than the best or optimal. The terms "coupled" and "connected", along with derivatives may have been used. It should be understood that these terms may have been used to indicate that two elements cooperate or interact with each other regardless whether they are in direct physical or electrical contact, or they are not in direct contact with each other.

Although embodimentembodiments have been illustrated and described herein, it will be appreciated by those of ordinary skill in the art that a variety of alternate and/or equivalent embodiments may be substituted for the embodimentembodiments shown and described without departing from the scope of the present disclosure. This application is intended to cover any adaptations or variations of the embodimentembodiments discussed herein.

Although the elements in the following claims are recited in a particular sequence with corresponding labeling, unless the claim recitations otherwise imply a particular sequence for implementing some or all of those elements, those elements are not necessarily intended to be limited to being implemented in that particular sequence.

Many alternatives, modifications, and variations will be apparent to those skilled in the art in light of the above teachings. Of course, those skilled in the art readily recognize that there are numerous applications of the disclosure beyond those described herein. While the present disclosure has been described with reference to one or more particular embodiments, those skilled in the art recognize that many changes may be made thereto without departing from the scope of the present disclosure. It is therefore to be understood that within the scope of the appended claims and their equivalents, the disclosure may be practiced otherwise than as described herein.

What is claimed is:

1. A first user device, comprising:

at least one processor; and a non-transitory memory to store instructions, which when executed by the at least one processor, cause the at least one processor to:

receive a location reference indication configuration to configure the first user device to transmit or receive an indication message; and transmit the indication message over a sidelink, wherein the indication message is indicative of a location reference available on the sidelink for positioning assistance, wherein the first user device is a location reference device configured to:

provide the indication message over the sidelink for a second user device and a measurement reference of positioning for the second user device, wherein the first user device provides the measurement reference of positioning for the second user device by measuring a reference signal (RS) transmitted by the second user device for usage as the measurement reference of positioning.

2. The first user device according to claim 1, wherein the instructions further cause the at least one processor to receive the location reference indication configuration via a dedicated signaling, a broadcast signaling, or a groupcast signaling.

3. The first user device according to claim 1, wherein the indication message comprises at least one of the following:

a location reference identity of the first user device;

an indication on whether the first user device is capable to assist absolute positioning of a second user device;

an indication on whether the first user device is capable to transmit positioning reference signals (PRSs) over the sidelink;

an indication on whether the first user device is capable to carry out positioning measurement on the sidelink;

location information indicating the second user device whether the first user device is able to assist the second user device in positioning;

an indication of a time duration for which information provided in the indication message is valid;

a PRS capability level indicative of a supported level to transmit the PRSs over the sidelink;

a measurement capability level indicative of a level of the positioning measurement on the sidelink; or a location information accuracy level indicative of an accuracy level of the location information from the first user device.

4. The first user device according to claim 3, wherein the indication message comprises at least a first part and a second part, and wherein the first part of the indication message and the second part of the indication message are transmitted in separate messages.

5. The first user device according to claim 4, wherein the first part of the indication message comprises at least one of:

the location reference identity of the first user device;

the indication on whether the first user device is capable to assist the absolute positioning of the second user device;

the PRS capability level;

the measurement capability level; or the location information accuracy level.

6. The first user device according to claim 1, wherein the indication message is carried in one of:

a Physical Sidelink Broadcast Channel (PSBCH);

a Physical Sidelink Shared Channel (PSSCH);

a Physical Sidelink Control Channel (PSCCH);

a Medium Access Control Control Element (MAC-CE); or a PC5-RRC interface for sidelink communication.

7. The first user device according to claim 1, wherein the instructions further cause the at least one processor to:

receive a location information request, wherein the location information request is used to update a status of the first user device to be used as location reference device for a second user device, and wherein the location information request comprises at least one of:

location coordinates of the first user device including uncertainty information of a location estimation;

a velocity estimate of the first user device, including speed, bearing information and uncertainty information of the velocity estimate;

information on a location source positioning technology;

a location time stamp indicative of a time when the location estimation is valid;
an indication on whether the first user device is a location reference; or
a valid time duration of information included in the location information request.

8. The first user device according to claim 7, wherein the instructions further cause the at least one processor to:
send a location information update to a network device, wherein the location information update is used to update the status of the first user device to be used as a location reference device for the second user device, and wherein the location information update comprises at least one of:
a parameter indicating whether the first user device carries out the update;
update timing information indicating when or how often the first user device carries out the update; or
parameters to be updated.

9. The first user device according to claim 7, wherein the location information request is received from a Location Management Function (LMF) via LTE positioning protocol (LPP) or new radio positioning protocol annex (NRPPa).

10. The first user device according to claim 1, wherein the location reference indication configuration is received via at least one of:
LTE positioning protocol (LPP);
new radio positioning protocol annex (NRPPa); or
radio resource control (RRC) protocol.

11. A network device, comprising:
a processor, configured to obtain a location reference indication configuration, wherein the location reference indication configuration is used to configure a first user device to transmit or receive an indication message over a sidelink to or from a second user device, wherein the indication message is indicative of a location reference available on the sidelink for positioning assistance, and wherein the first user device is a location reference device configured to provide the indication message over the sidelink for a second user device and a measurement reference of positioning for the second user device, wherein the first user device provides the measurement reference of positioning for the second user device by measuring a reference signal (RS) transmitted by the second user device for usage as the measurement reference of positioning; and
a transceiver, configured to transmit the location reference indication configuration to the first user device.

12. The network device according to claim 11, wherein the indication message comprises at least one of the following:
a location reference identity of the first user device;
an indication on whether the first user device is capable to assist absolute positioning of the second user device;
an indication on whether the first user device is capable to transmit positioning reference signals (PRSs) over the sidelink;
an indication on whether the first user device is capable to carry out a positioning measurement on the sidelink;
location information indicating the second user device whether the first user device is able to assist the second user device in positioning;
an indication of a time duration for which information provided in the indication message is valid;
a PRS capability level indicative of a supported level to transmit the PRSs over the sidelink;
a measurement capability level indicative of a level of the positioning measurement on the sidelink; or
a location information accuracy level indicative of an accuracy level of the location information from the first user device.

13. The network device according to claim 11, wherein the transceiver is further configured to transmit the location reference indication configuration via a dedicated signaling, a broadcast signaling or a groupcast signaling.

14. The network device according to claim 11, wherein the location reference indication configuration is transmitted via at least one of:
LTE positioning protocol (LPP);
new radio positioning protocol annex (NRPPa); or
radio resource control (RRC) protocol.

15. A method for indicating a location reference for positioning assistance, the method comprising:
receiving, by a first user device, a location reference indication configuration;
based on the location reference indication configuration, configuring the first user device to transmit or receive an indication message; and
transmitting, by the first user device, the indication message over a sidelink, wherein the indication message is indicative of a location reference available on the sidelink for positioning assistance, wherein the first user device is a location reference device configured to:
provide the indication message over the sidelink for a second user device and a measurement reference of positioning for the second user device, wherein the first user device provides the measurement reference of positioning for the second user device by measuring a reference signal (RS) transmitted by the second user device for usage as the measurement reference of positioning.

16. A non-transitory computer readable medium storing computer-executable code or computer-executable instructions that, when executed, causes at least one computer to execute the method according to claim 4.

17. A method for providing a location reference indication configuration for positioning assistance, the method comprising:
obtaining, by a network device, a location reference indication configuration, wherein the location reference indication configuration is used to configure a first user device to transmit or receive an indication message over a sidelink to or from a second user device, wherein the indication message is indicative of a location reference available on the sidelink for positioning assistance, and wherein the first user device is a location reference device configured to provide the indication message over the sidelink for a second user device and a measurement reference of positioning for the second user device, wherein the first user device provides the measurement reference of positioning for the second user device by measuring a reference signal (RS) transmitted by the second user device for usage as the measurement reference of positioning; and
transmitting, by the network device, the location reference indication configuration to the first user device.

18. A non-transitory computer readable medium storing computer-executable code or computer-executable instructions that, when executed, causes at least one computer to execute the method according to claim 17.

19. The method according to claim 17, further comprising:

receiving the location reference indication configuration via a dedicated signaling, a broadcast signaling, or a groupcast signaling.

20. The method according to claim 17, wherein the indication message comprises at least one of the following:

a location reference identity of the first user device;

an indication on whether the first user device is capable to assist absolute positioning of a second user device;

an indication on whether the first user device is capable to transmit positioning reference signals (PRSs) over the sidelink;

an indication on whether the first user device is capable to carry out positioning measurement on the sidelink;

location information indicating the second user device whether the first user device is able to assist the second user device in positioning;

an indication of a time duration for which information provided in the indication message is valid;

a PRS capability level indicative of a supported level to transmit the PRSs over the sidelink;

a measurement capability level indicative of a level of the positioning measurement on the sidelink; or a location information accuracy level indicative of an accuracy level of the location information from the first user device.

* * * * *